(12) United States Patent
Ghori et al.

(10) Patent No.: US 6,282,714 B1
(45) Date of Patent: Aug. 28, 2001

(54) DIGITAL WIRELESS HOME COMPUTER SYSTEM

(75) Inventors: Amar Ghori, El Dorado Hills; John White, Cameron Park, both of CA (US)

(73) Assignee: Sharewave, Inc., El Dorado Hills, CA (US)

( * ) Notice: Subject to any disclaimer, the term of this patent is extended or adjusted under 35 U.S.C. 154(b) by 0 days.

(21) Appl. No.: 08/792,003

(22) Filed: Jan. 31, 1997

(51) Int. Cl.[7] .................................................. H04N 7/16
(52) U.S. Cl. ...................................... 725/81; 725/78
(58) Field of Search ........................ 455/6.1, 5.1, 6.2, 455/4.2, 6.3; 348/8, 10, 9, 6, 7, 12, 13; 345/327; 725/81, 82, 78; H04N 7/16, 7/173

(56) References Cited

U.S. PATENT DOCUMENTS

| | | |
|---|---|---|
| 5,046,066 | 9/1991 | Messenger . |
| 5,081,643 | 1/1992 | Schilling . |
| 5,101,406 | 3/1992 | Messenger . |
| 5,164,942 | 11/1992 | Kamerman et al. . |
| 5,177,604 | 1/1993 | Martinez . |
| 5,181,200 | 1/1993 | Harrison . |
| 5,192,999 | 3/1993 | Graczyk et al. . |
| 5,276,703 | 1/1994 | Budin et al. . |
| 5,289,497 | 2/1994 | Jacobson et al. . |
| 5,297,144 | 3/1994 | Gilbert et al. . |
| 5,359,625 | 10/1994 | Vander Mey et al. . |
| 5,369,639 | 11/1994 | Kamerman et al. . |
| 5,398,257 | 3/1995 | Groenteman . |
| 5,404,377 | 4/1995 | Moses . |
| 5,408,078 | 4/1995 | Campo et al. . |
| 5,418,812 | 5/1995 | Reyes et al. . |
| 5,421,030 | 5/1995 | Baran . |
| 5,423,086 | 6/1995 | Cannon et al. . |
| 5,428,636 | 6/1995 | Meier . |
| 5,432,838 | 7/1995 | Purchase et al. . |
| 5,438,329 | 8/1995 | Gastouniotis et al. . |
| 5,442,652 | 8/1995 | Jacobson . |
| 5,442,659 | 8/1995 | Bauchot et al. . |

(List continued on next page.)

FOREIGN PATENT DOCUMENTS

| | | |
|---|---|---|
| 0710017 | 1/1996 | (EP) . |
| 0 783 232 A2 | 7/1997 | (EP) . |
| WO9636953 | 11/1996 | (WO) . |

OTHER PUBLICATIONS

International Search Report.
International Search Report; PCT/US 98/01819.
Wireless Printing (Flyer) AreoComm wireless, 13228w. 99th Street, Lenexa, KS 66215–9937, fax: (913) 492–1241, 1 page total (8/96).
EETIMES–Headline News "CEBus controller ICs aimed at enabling smart homes". http://techweb,cmp...924news/ce-bus.html, 1 page total (Oct. 22, 1996).
Berinato, S., "Graphics board outputs to T.V." PC Magazine (Aug. 1996) pp. 107–108.
Los Angles Times Business and Technology, "Web TV May Not Be For Everyone, but It's a Step in the Right Direction;" (Sep. 30, 1996).

*Primary Examiner*—Chris Grant
(74) *Attorney, Agent, or Firm*—Blakely Sokoloff Taylor Zafman LLP

(57) ABSTRACT

The present invention provides a digital wireless home computer system. One embodiment of the invention includes a computer with a first digital wireless transceiver, and a home input/output node having a second digital wireless transceiver for communicatively coupling to the first wireless transceiver. This node also has (1) an output device, communicatively coupled to the second wireless transceiver, for presenting an output presentation based on signals received from the computer via the wireless transceivers, and (2) an input device, communicatively coupled to the second wireless transceiver, for receiving input signals from a user interfacing with the home input/output node.

39 Claims, 13 Drawing Sheets

U.S. PATENT DOCUMENTS

| | | |
|---|---|---|
| 5,473,631 | 12/1995 | Moses . |
| 5,485,634 | 1/1996 | Weiser et al. . |
| 5,487,069 | 1/1996 | O'Sullivan et al. . |
| 5,488,631 | 1/1996 | Gold et al. . |
| 5,502,726 | 3/1996 | Fischer . |
| 5,521,958 | 5/1996 | Selig et al. . |
| 5,528,301 | 6/1996 | Hau et al. . |
| 5,528,660 | 6/1996 | Heins et al. . |
| 5,535,209 | 7/1996 | Glaser et al. . |
| 5,544,164 | 8/1996 | Baran . |
| 5,546,381 | 8/1996 | Fukushima . |
| 5,570,085 | 10/1996 | Bertsch . |
| 5,675,390 | 10/1997 | Schindler et al. . |
| 5,721,693 | 2/1998 | Song . |
| 5,793,413 | 8/1998 | Hylton et al. ............ 348/12 |
| 5,850,340 * | 12/1998 | York ........................ 364/188 |
| 5,852,437 | 12/1998 | Wugofski et al. ........... 345/327 |
| 5,940,387 | 8/1999 | Humpleman ............ 348/12 |

* cited by examiner

DIGITAL WIRELESS HOME COMPUTER SYSTEM

BACKGROUND OF THE INVENTION

Millions of computers have been purchased for both corporate and home use. In the office environment, these computers have been put to various tasks, such as word processing, accounting, computer-aided design, and on-line searching. Computers have been similarly used in the home environment. However, traditionally, computers have been used as stand-alone computers in this environment. Thus, in the home environment, the computing resources of computers have not been fully utilized. This under-utilization has been the case even though the computational capabilities of these computers have drastically improved in the past couple of years.

In the past several years, there has been some discussion regarding Smart Homes, in which computers are connected to appliances to control the operation of appliances. For example, these computers are typically said to turn on/off these appliances and to control their operational settings. These systems are typically said to couple the computers and the appliances through wired communication links. Such wired communication links are disadvantageous as they are difficult and costly to install.

FIGS. 1 and 2 present recent prior art systems that couple a computer to a television ("TV") or a video cassette recorder ("VCR") through a scan or television converter. These converters couple to the TV or VCR through a wired or wireless link. However, these systems differ in that system 100 only utilizes processor 115 to generate RGB data for display, while system 200 utilizes a dedicated graphics accelerator 215 to generate the display data.

As shown in these figures, these prior systems typically include a display device 140 and a computer 105, which includes a bus 110, a processor 115, and a storage 120. Bus 110 connects the various internal modules of the computer. For instance, bus 110 couples processor 115 and storage 120. The storage hardware stores data, such as (1) an application program 125 for performing certain tasks, (2) an operating system 130 for controlling the allocation and usage of the computer's hardware and software resources, and (3) I/O drivers 135 for providing the instruction set necessary to control I/O devices, such as display device 140.

Through bus 110, processor 115 retrieves the data stored in storage 120. The processor then processes the data. At times, the results of this processing is displayed on display device 140, which also couples to bus 110. This display device is typically a PC monitor, such as a cathode ray tube (CRT), for displaying information to a computer user. Other prior art systems utilize a liquid crystal display (LCD) for their display device.

Both display devices 140 of FIGS. 1 and 2 receive the display RGB data from Y-tap connectors or similar pass-through devices (not shown). Also, in both these systems, a digital-to-analog converter (a DAC, which is not shown) converts digital RGB signals to analog RGB signals for display on display devices 140. This DAC can be a part of computer 105, add-in card 210, display device 140, or converters 145.

The Y-tap connector also supplies the RGB data to converters 145, which convert the received signals to analog NTSC or PAL signals supplied to the television or the VCR. Depending on the location of the DACs, these converters can be either scan converters or TV converters. Specifically, if computer 105 or graphics engine 215 contain a DAC, and therefore supply analog RGB data to converter 145, then the converters are scan converters for converting analog RGB data to NTSC or PAL encoded signals. On the other hand, when display device 140 and converter 145 contain the DACs, the converters are TV converters for converting digital RGB data to digital YCrCb data, which are then encoded to NTSC or PAL encoded signals.

Some prior art systems utilize analog wireless links to connect a converter (such as converters 145) to a TV. These analog wireless links are typically radio frequency ("RF") links operating at the 900 MHz frequency range. Also, one prior art system establishes a bi-directional link between the converter and the television. The downstream link used by this prior art system (i.e., the link for forwarding communications from the computer to the television) is also an analog RF link.

There are a number of disadvantages associated with the use of analog RF links. For instance, a receiver receives a degraded signal through such a link because the received signal is composed of a number of signals that correspond to the same transmitted signal but reach the receiver through a variety of paths. In other words, such a link does not offer protection against signal degradation due to the multi-path phenomena.

In addition, such communication links are susceptible to intra-cell interference from noise generated in the communication cell formed around the periphery of the computer and the television. Intra-cell interfering noise can be generated by other as appliances or by normal household activity. The intra-cell interfering noise, in turn, can deteriorate the quality of the transmitted data, and thereby deteriorate the quality of the TV presentation.

Analog communication links also are susceptible to inter-cell interference. Such interference can be noise interference from noise sources outside of the communication cell formed by the computer and the television. For instance, such interfering noise can be attributable to RF communications from communication cells (perhaps formed by other computers and televisions) adjacent to the cell formed by the computer and the television. These inter-cell interfering noises can further deteriorate the quality of the transmitted data and the presentation.

Inter-cell interference also refers to eavesdropping on the communications from the computer to the television. The analog communication link between the computer and the television is typically not a secure communication link, because securing such a link is often difficult. Therefore, an eavesdropper outside of the communication cell can tap into the signals transmitted from the computer to the television.

FIG. 3 presents the general operational flow 300 of the prior art systems 100 and 200. As shown in this figure, a graphics command is first generated by an application program 305. This command is then passed to the graphics engine 320 (i.e., processor 115 or graphics engine 215) via the operating system and the display driver. In turn, based on the received graphics command, the graphics engine 320 generates RGB data. This RGB data is then routed to PC monitor 140 for display. The converter 325 also receives the RGB data and converts it into analog NTSC or PAL signal supplied to the television or the VCR.

Thus, as set forth in FIG. 3, these prior art systems (1) intercept the RGB signals prepared for display on monitor 140, and then (2) convert this RGB data to analog NTSC or PAL encoded data for a TV display. Because the signals forwarded to the television or the VCR are tapped at such an advanced operational stage, these systems have a number of disadvantages.

For instance, the quality of their TV presentation suffers, because the TV images are generated based on RGB data composed for the PC monitor. In other words, the quality of the display deteriorates once it has to be remapped for analog NTSC after being composed for PC monitor. This remapping is also disadvantageous because it is inefficient and computationally expensive. Numerous calculations that are performed downstream from the drivers to compose the RGB data for the PC monitor have to be recalculated to obtain the graphical images for the television or the VCR.

Consequently, there is a need in the art for a wireless home computer system which efficiently uses a computer in the home environment. There is also a need for a wireless home computer system which uses superior digital wireless communication links. In addition, a home computer system is needed which composes output presentations based on the type of the output devices.

SUMMARY OF THE INVENTION

The present invention provides a digital wireless home computer system. One embodiment of the invention includes a computer and an output device communicatively coupled to the computer through a digital wireless link. This output device has a display screen for displaying presentations based on signals transmitted from the computer to the device through the link. In one embodiment of the invention, this output device is a television. One embodiment communicatively couples the output device and the computer through a spread spectrum link.

Still another embodiment of the invention has a computer with a first digital wireless transceiver, and a home input/output node having a second digital wireless transceiver for communicatively coupling to the first wireless transceiver. This node also has (1) an output device, communicatively coupled to the second wireless transceiver, for presenting an output presentation based on signals received from the computer via the wireless transceivers, and (2) an input device, communicatively coupled to the second wireless transceiver, for receiving input signals from a user interfacing with the home input/output node.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

The invention provides a digital wireless home computer system. In the following description, numerous details are set forth for purpose of explanation. However, one of ordinary skill in the art would realize that the invention may be practiced without the use of these specific details. In other instances, well-known structures and devices are shown in block diagram form in order not to obscure the description of the invention with unnecessary detail.

Figure 4:
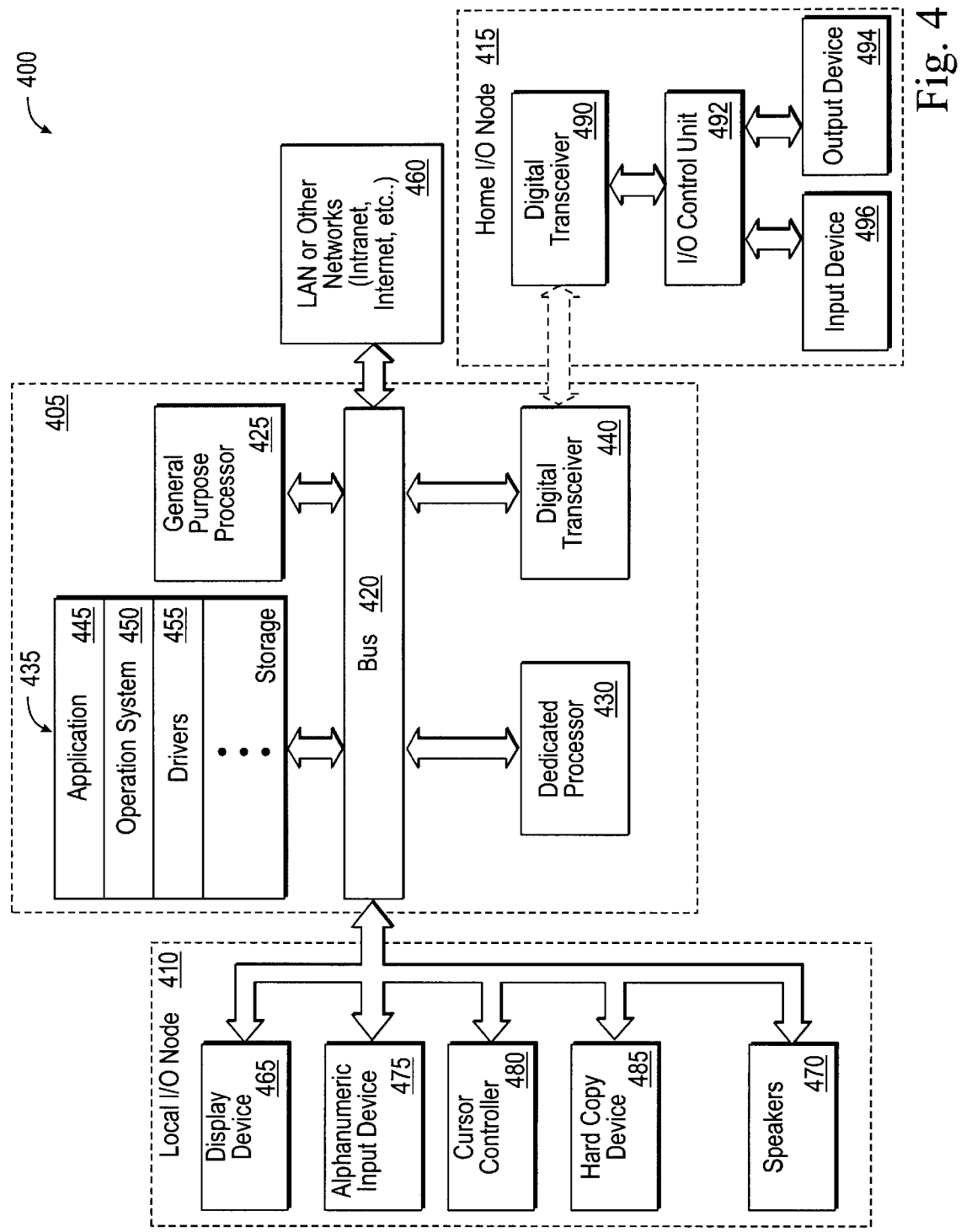
FIG. 4 presents one embodiment of the computer system of the invention.

FIG. 4 sets forth one embodiment of a computer system of the invention. Computer system 400 includes a computer 405, a local computer input/output ("I/O") node 410, and a home I/O node 415. Computer 405 can be a network computer, a personal computer (such as an Intel® based computer), a workstation (such as a SPARC®, ULTRA-SPARC®, MIPS®, or HP® station), etc.

One embodiment of this computer composes audio-visual data for presentation at the computer I/O node 410, which couples to the computer either through a hardwired connection or a wireless link. Also, in one embodiment of the invention, computer 405 composes the audio-visual data from high-level audio-visual commands, and transmits this data via a digital wireless link to the home I/O node for presentation of this data.

In an alternative embodiment, computer 405 does not compose the audio-visual data for the home I/O node, but rather transmits the audio-visual commands to the home I/O node, which composes the audio-visual data. For instance, in one such embodiment, computer 405 transmits ASCII code to the home I/O unit, which then generates a displayed output text based on this transmitted code. In yet another embodiment of the invention, computer 405 transmits particular audio-visual commands (such as multi-media commands including graphics, video, and audio primitives) to the home I/O node, while also composing and transmitting audio-visual data based on other audio-visual commands.

As shown in FIG. 4, computer 405 includes bus 420, general-purpose processor 425, dedicated processor 430, storage 435, and digital transceiver 440. Bus 420 collectively represents all of the communication lines that connect the numerous internal modules of the computer. Even though FIG. 4 does not show bus controller, one of ordinary skill in the art will appreciate one embodiment of computer 405 includes a variety of bus controllers for controlling the operation of the bus.

Bus 420 couples processors 425 and 430, which process digital data, and storage 435, which stores digital data. One embodiment of storage 435 stores application programs 445 (such as a word processing program, a multi-media game program, a computer aided design program, etc.) for performing certain types of tasks by manipulating text, numbers, and/or graphics. Storage 435 also stores an operating system 450 (such as Windows 95® sold by Microsoft Corporation). An operating system ("OS") serves as the foundation on which application programs operate and controls the allocation and usage of hardware and software resources (such as memory, processor, storage space, peripheral devices, drivers, etc.).

Storage 435 further stores driver programs 455, which provide the instruction set necessary for operating (e.g., controlling) particular I/O devices (such as the devices at I/O node 410 or the devices of home I/O unit 415). One example of the operation of the drivers, the operating system, and the application programs is described below by reference to FIGS. 11–13.

One embodiment of storage 435 includes a read and write memory (e.g., RAM). This memory stores data and program instructions for execution by processors 425 and 430, and stores temporary variables or other intermediate information during the operation of the processor. An embodiment of storage 435 also includes a read only memory (ROM) for storing static information and instructions for the processors. An embodiment of storage 435 further includes a mass data storage device, such as a magnetic or optical disk and its corresponding disk drive.

In one embodiment of the invention, the source code necessary for the operation of the invention is downloaded from mass data storage device (e.g., downloaded from a hard drive or a floppy disk) to the read/write memory during the operation of the computer. The computer then utilizes the software residing in the read/write memory to direct the operation of the processors. However, firmware instructions (i.e., the source code residing in the read-only memory) can also direct the operation of the processors.

In one embodiment of the invention, processor 425 plus instructions stored in storage 435 serve as the I/O engine for the computer I/O node 410, while dedicated processor 435 (which can be a dedicated multi-media processor) plus instructions stored in storage 435 serve as the I/O engine for home I/O unit 415. In an alternative embodiment of the invention set forth in FIG. 5, a second dedicated processor 510 is used, instead of processor 425, to form the I/O engine for the local I/O node.

In yet another embodiment of the invention, a single processor (such as dedicated processor 430 or general-purpose processor 425) serves as the I/O engine for both the I/O nodes. Still another embodiment of the invention uses a dedicated ASIC I/O engine for some or all of the I/O functions (such as communication control, signal formatting, audio/graphics processing, compression, filtering, etc.) for either or both of the I/O nodes. One such embodiment is described below by reference to FIG. 6.

In different embodiments of the invention, the I/O engines of the computer perform a number of different tasks. For instance, in one embodiment, the computer's I/O engine for the home node just controls the communication between the computer and the home node (e.g., the I/O engine simply controls the transmission of audio-visual commands to the home I/O node, and/or the I/O engine formats the signals for transmission to the home node). Another embodiment of the computer's home I/O engine transmits particular audio-visual commands (e.g., multi-media commands including audio primitives or graphics primitives, such as graphical, text, or video primitives) to the home I/O node, while also composing and transmitting audio-visual data based on other audio-visual commands to the home node.

In another embodiment of the invention, the local node's I/O engine serves as an audio-visual processing engine and processes audio-visual instructions (from application 445, operating system 450, and/or drivers 455) for the computer I/O node 410, while the home node's I/O engine serves as an audio-visual processing engine and processes audio-visual instructions (from application 445, operating system 450, and/or drivers 455) for home I/O unit 415. Other embodiments of the computer's I/O engines include (1) a compression engine performing signal compression, (2) an encoding engine performing digital signal encoding, (3) a digital filtering engine performing digital filtering, and/or (4) and a frame synchronization engine performing audio-visual frame synchronization.

As shown in FIG. 4, bus 420 also couples computer 405 to a network 460 through a network adapter (not shown). In this manner, the computer can be a part of a network of computers (such as a local area network ("LAN"), a wide area network ("WAN"), or an Intranet) or a network of networks (such as the Internet). Through this network connection, one embodiment of the computer is a network computer.

Computer 405 also communicatively couples to a local computer I/O node 410 through a hardwired connection or a wireless link. This node includes a display device 465, speakers 470, an alphanumeric input device 475, a cursor controller 480, and a hard copy device 485. The display device (such as a cathode ray tube (CRT) or a liquid crystal display (LCD)) couples to bus 420, and displays information to a computer user. Bus 420 also couples to speakers 470 which play the audio data outputted by computer 405.

Alphanumeric input device 475 (e.g., a keyboard) couples to bus 420 for allowing a user to forward information and commands to computer 405. Another user input device coupled to bus 420 is cursor controller 480. This device may take many different forms, such as a mouse, a trackball, a stylus tablet, a touch-sensitive input device (e.g., a touchpad), etc. Another device which may be coupled to bus 420 is a hard copy device 485 for printing a hard copy on paper.

Computer 405 also communicatively couples to a home I/O node 415. As shown in FIG. 4, the I/O interface of this node couples to the software and hardware components of the computer via I/O control unit 492, digital wireless transceivers 490 and 440, and bus 420. The home I/O node can include a computer, a home appliance unit, or a peripheral that includes an 1/0 interface. Examples of computers include personal computers (such as Intel® based computers, Apple® Computers, etc.), workstations (such as SPARC®, ULTRA-SPARC®, MIPS®, or HP® stations), etc. Peripherals include terminals, printers, monitors, keyboards, plotters, graphic tablets, scanners, joysticks, modems, etc. Home appliances include audio-visual equipment (such as televisions, cameras, VCRs), utility and kitchen appliances (such as refrigerators, microwaves), etc.

The I/O interface of the home I/O node includes (1) input device 496 for receiving input commands from operators at the home I/O node, and (2) output device 494 for presenting an output presentation to viewers at this node. Input device 496 allows a user of the home I/O unit to enter input signals. Certain input signals are then forwarded to computer 405. Examples of such an input device include a keyboard, a cursor controller, a remote controller, a keypad, a joystick, or a game controller.

Output device 494, on the other hand, allows audio data and/or visual data to be presented (e.g., presented on a display screen or through speakers) to the user of the home I/O unit. Particular output presentations are based on signals received from the computer via the digital wireless link. Examples of such an output device include a television, a PC monitor, an LCD screen, a speaker, etc.

Although FIG. 4 only shows one input device and one output device communicatively coupled to the computer, one of ordinary skill will realize that different embodiments of the home I/O node do not include any input or output devices, or include additional input and output devices. Also, different embodiments of the home I/O node do not communicatively couple the input device to the computer, or do not communicatively couple output device to the computer.

The input and output devices 496 and 494 couple to computer 405 via transceiver 490 and I/O control unit 492 of the home I/O unit. Transceiver 490 is a digital wireless communication device for communicating on a wireless channel to the computer's digital transceiver 440. In one embodiment of the invention, transceivers 440 and 490 are spread spectrum transceivers.

Spread spectrum transceivers utilize spread spectrum modulation to modulate signals. Spread spectrum modulation spreads a relatively narrow band of transmitted frequencies over a broad band (which, for example, can be ten times as wide as the narrow band) with lower energy content to minimize noise and interference.

More specifically, spread spectrum transceivers utilize a form of radio transmission in which the signal is distributed over a broad frequency range. This distribution pattern is based on either direct sequence coding or frequency hopping. In direct sequence coding, the information to be transmitted is modified by a multi-bit binary chipping code, which spreads the signal out over a broader frequency range. Only the receiver knows the code, and thus only it can decode the received signal. Alternatively, in frequency hopping, a transmitter transmits at a particular frequency for a short time interval, then switches to another frequency for another short interval, and so on. Only the receiver knows the random frequency selection sequencing.

Furthermore, one embodiment of transceivers 440 and 490 communicate through an isochronous (i.e., time sensitive) link. The operation of an isochronous communication link is dependent on constant time intervals. Such a connection assures that there always is an integral number of time intervals between any two transmission, whether synchronous or asynchronous. This type of transmission capability is beneficial for transmitting video and audio signals in real time. Thus, one embodiment of transceivers 440 and 490 are spread spectrum transceivers that communicate through an isochronous link.

The I/O control unit serves as an interface unit between the home node's I/O devices and its transceiver. This control unit is either (1) a programmable computer, (2) a network computer, (3) a control logic circuit of a peripheral or the transceiver, or (4) an application specific integrated circuit coupled to an appliance, a peripheral or a computer.

I/O control unit 492 couples to transceiver 490 to receive information supplied from the computer via transceiver 440. The control unit transforms the received information to a format capable of presentation at the home I/O node, and then supplies this data to this node's output device (e.g., to a television, a monitor, a speaker, etc.) for presentation to a user.

For instance, when computer 405 composes the audio-visual data and transmits an encoded (e.g., MPEG encoded) stream of audio-visual data to the home input/output unit, one embodiment of the I/O control unit samples and decodes the received encoded data At stream to extract the composed audio-visual data. For the embodiment having a computer that transmits audio-visual commands to home I/O node 415, I/O control unit 492 samples the received signal to extract the commands and composes audio-visual data based on the extracted commands. In yet other embodiments which have a computer that transmits particular audio-visual commands as well as audio-visual data based on other audio-visual commands, the I/O control unit extracts the commands and composes additional audio-visual data based on the extracted commands.

The control unit then supplies the composed audio-visual data to this node's output device for presentation. Prior to supplying the data to the output device, one embodiment of the I/O control unit also encodes the extracted audio-visual data in a unique format for presentations at output device (e.g., an NTSC or PAL format for a television presentation).

I/O control unit 492 also couples to input device 496 to receive input data from the user of this node's I/O unit. This coupling can be through a wireless channel (such as an infrared or radio-frequency, digital or analog channel) or a wired channel. The control unit then forwards this data to the computer via transceivers 490 and 440. The computer then decodes the communication and extracts the data from the decoded communication. The computer then processes the data and, if needed, responds to the home I/O node. For instance, after extracting the input data, the computer might call up an application program, which then instructs the processor to process the input data, and, if needed, to respond to the home I/O node.

In this manner, computer system 400 allows a user to interact with a computer 405 from a remote home I/O node. From this remote node, the user can access a program run on the computer, control the operation of the computer, and/or control the operation of a device coupled to the computer (such as another computer, a computer network, a peripheral, or an appliance). The user can also receive output presentations at the remote I/O node from the computer. Some embodiments of the home I/O node are stationary nodes, while others are not. One portable I/O node includes a portable I/O control unit and a portable output device.

One of ordinary skill in the art would appreciate that any or all of the components of computer system 400 may be used in conjunction with the invention, and that alternative system configurations may be used in conjunction with the invention. For instance, alternative embodiments of the invention do not include a local I/O node, and/or do not connect to a network 460. Also, although FIG. 4 sets forth a home I/O node with a separate I/O control unit 492, transceiver 490, output device 494, and input device 496, one of ordinary skill in the art would appreciate that alternative embodiments of the invention have the I/O control unit and/or the transceiver as part of the circuitry of this node's input and/or output devices.

Figure 6:
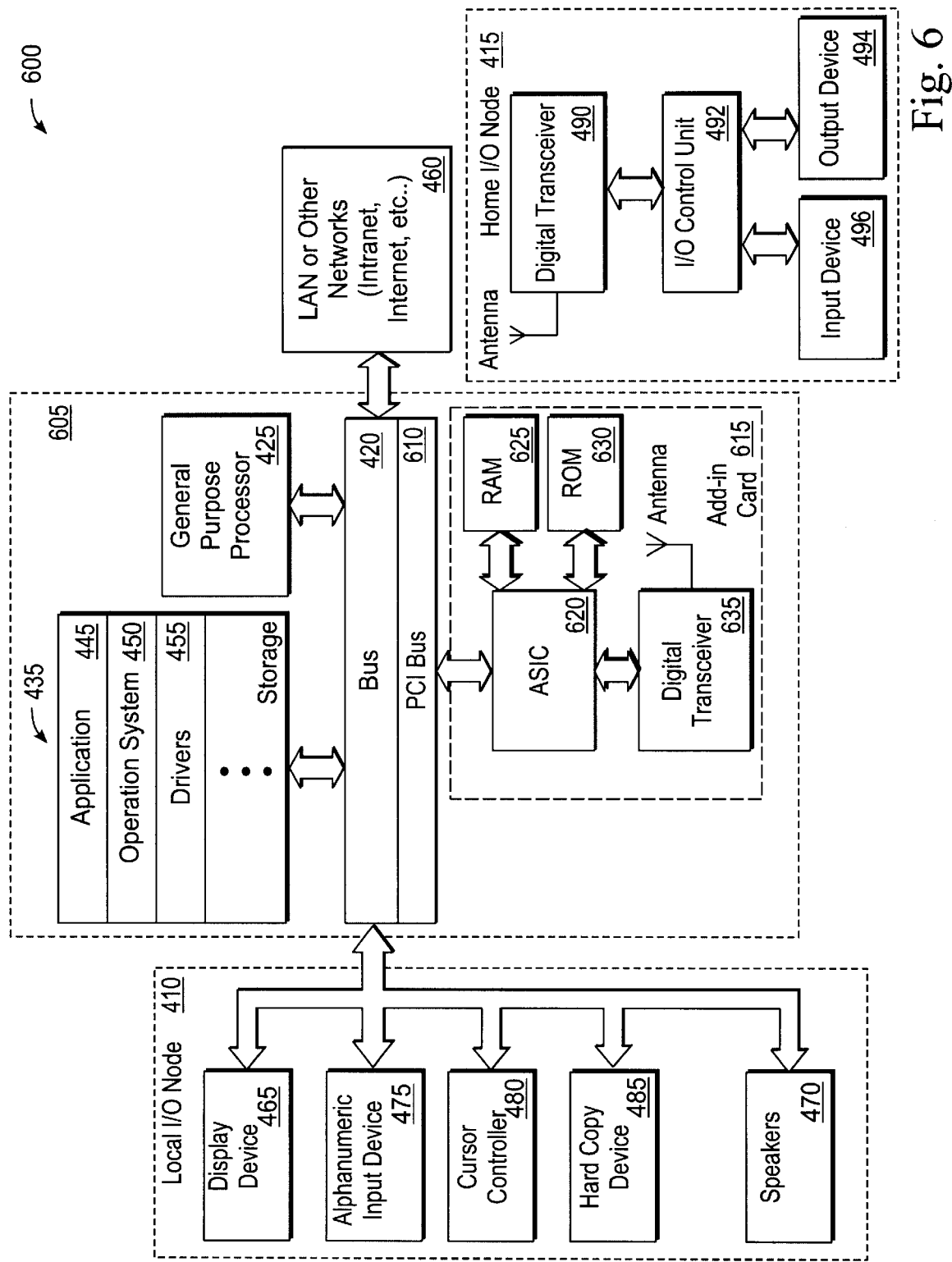
FIG. 6 presents yet another embodiment of the computer system of the invention.

FIG. 6 sets forth a block diagram of another embodiment of the invention's computer system. This computer system uses a dedicated I/O processing engine for processing some or all of the I/O functions (such as audio/graphics processing, compression, filtering, etc.) for the home I/O unit.

This dedicated engine is formed on an add-in card 615, which plugs into a PCI-connection socket of the computer and thereby couples to the computer's PCI bus to communicate to the computer's resources (e.g., its processor). This system includes a digital transceiver 635, an application specific integrated circuit (ASIC) 620, a random access memory 625, and a read-only memory 630.

Through an antenna, digital transceiver 635 transmits and receives data to and from the digital transceiver of the home I/O node. One embodiment of this digital transceiver is a spread spectrum radio transceiver and is provided in the Prism® chipset from Harris Corporation. Other vendors who provide digital spread spectrum transceivers are Hewlett-Packard, AMI, Motorola.

Other embodiments of this transceiver includes digital PCS or digital cellular transceivers. A number of embodiments of the invention use digital transceivers which encrypt their signals to protect against eavesdroppers. A number of embodiments of the invention also perform error coding and decoding on the transmitted and received signals in order to guard against errors due to transmission noise.

Transceiver 635 couples to ASIC 620 through a bi-directional link for transmitting data, address, and control signals. Through this bi-directional coupling, ASIC 620 communicates with the processor of digital transceiver 635 to transmit and receive data to and from the home I/O unit.

ASIC 620 serves as an interface between the I/O drivers and the home I/O node. Several embodiments of this ASIC compose audio-visual data from high-level audio and graphical commands, and forward (via transceiver 635) the composed digital data to home I/O units for presentation. In particular, a number of embodiments of ASIC 620 compose graphical data based on the type of output device used at their home I/O node.

For instance, one such embodiment composes graphical data in a YCrCb display format, which is advantageous when the output device at the home I/O node is a television. Other embodiments of ASIC 620 use other digital graphic formats, such as RGB, YUV, cmyk, etc., to represent the color space. A number of embodiments of ASIC 620 also compress and encode the audio-visual data prior to transmission to their home I/O nodes.

ASIC 620 also couples to RAM 625, which it uses as a composition buffer for storing audio-visual information for presentation, and as a scratch memory for other functions of the ASIC. For instance, when the application program forwards instructions to the ASIC for display, one embodiment of the ASIC composes a frame, compresses it, and then stores it in the RAM.

In this manner, the ASIC uses the RAMs as an intermediate storage for storing compressed frames prior to transmission to the home I/O node. Once the ASIC is ready to transmit the compressed data, the ASIC retrieves the compressed data from the RAM and forwards it to the digital transceiver for transmission to the home I/O node. ASIC 620 also couples to ROM 630. This memory stores the firmware instructions necessary for the operation of the ASIC. In addition, this memory can store look-up tables used by the ASIC in performing its compression and digital filtering functions.

Figure 7:
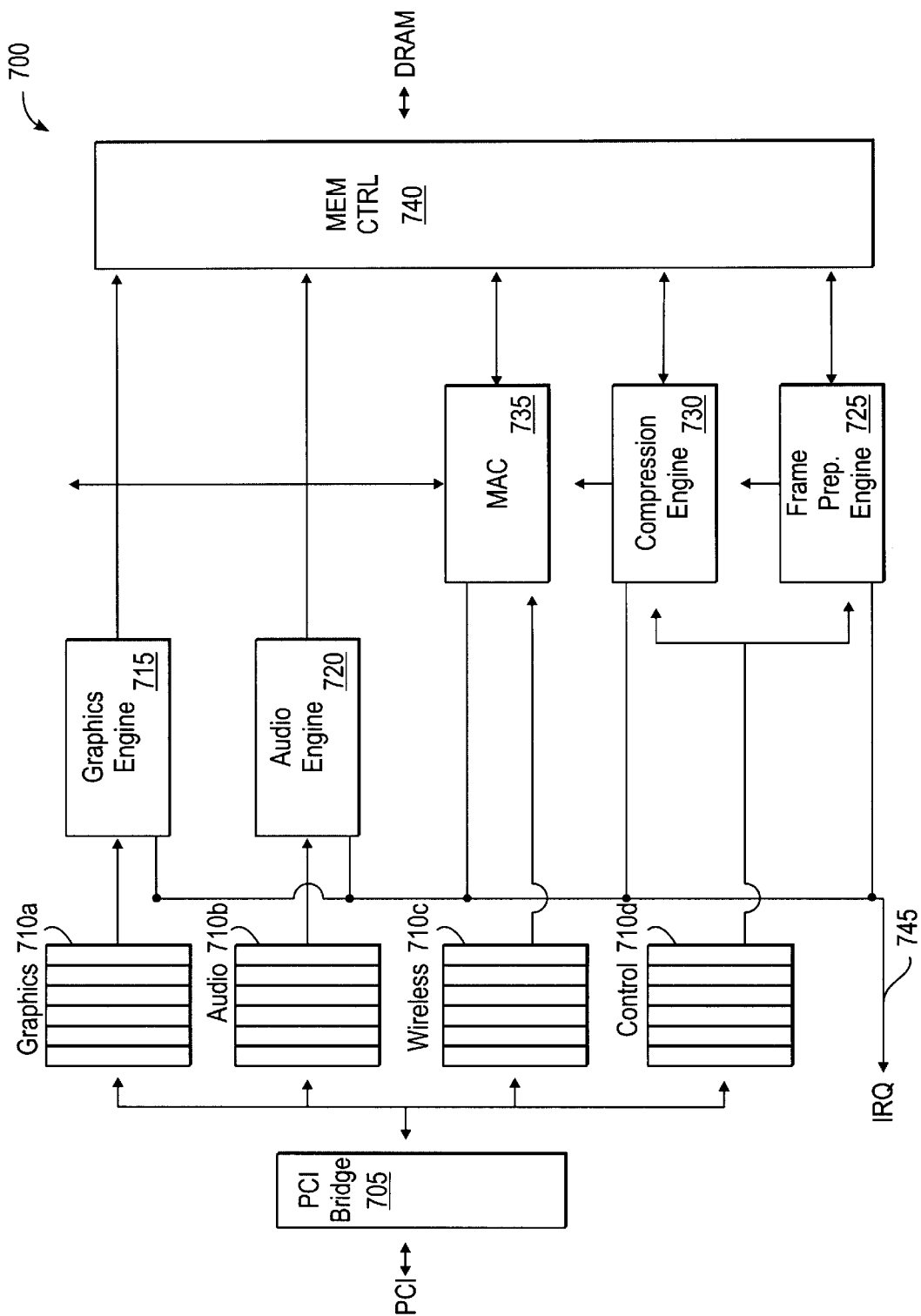
FIG. 7 presents one embodiment of an ASIC of the computer system of FIG. 6.

FIG. 7 sets forth one embodiment of ASIC 620 of FIG. 6. As shown in this figure, ASIC 700 includes a peripheral component interconnect ("PCI") bridge 705, data and control buffers 710, a graphics engine 715, an audio engine 720, a compression engine 725, a frame preparation engine 730, a media access controller ("MAC") 735, and a memory controller 740.

The PCI bridge provides an interface between the ASIC and the PCI bus. For instance, the PCI bridge provides PCI-compatible signaling for the card. The PCI bridge couples to a number of internal buffers 710 which temporarily store data and commands. One of these buffers is wireless buffer 710c, which receives commands for controlling the MAC. The PCI bridge also couples to a control buffer 710d, which serves as a temporary storage location for control commands controlling the compression and frame preparation engines. These control commands include reset commands, as well as other control commands and configuration information (such as commands for setting compression ratio, the image size, and the frame rate).

PCI bridge 705 also couples to graphics buffer 710a. This buffer temporarily stores high level graphics data and commands (such as line draw commands), transmitted from the application driver. The graphics engine 715 retrieves the stored data and commands from buffer 710a to compose graphic frames.

One embodiment of graphics engine 715 composes graphical data in a YCrCb display format from graphical primitives. Such a display format is advantageous when the home node's output device is a television. Other embodiments of the graphics engine use other digital graphic formats, such as RGB, YUV, cmyk, etc., to represent the color space. After performing its operations, the graphics engine stores the composed frame in the RAM via memory controller 740, which serves as an arbiter controlling the access of different resources to the RAM.

Similarly, PCI bridge 705 couples to audio buffer 710b, which temporarily stores audio data and commands transmitted from the application driver. In turn, the audio engine 720 retrieves the stored data and commands from buffer 710b and, based on them, composes the audio data accompanying the generated graphical frames. Audio engine 720 also stores its generated audio data in RAM 625 (which can be a DRAM) via memory controller 740.

Memory controller 740 also couples RAM 625 to frame preparation engine 725 and compression engine 730. Through this coupling, frame preparation engine 725 retrieves graphical frames and performs digital filtering operations, such as audio-visual artifact correcting operations, image scaling operations, and flicker reduction operations. After the frame preparation engine completes its operations, it either (1) supplies the frame to the compression engine, if this engine is idle, or (2) stores the frame back in the RAM to be retrieved by the compression engine at a later time.

Compression engine compresses the graphical frames. In one embodiment of the invention, this engine uses a known compression technique (such as an MPEG compression technique) to compress the composed data frames for transmission. The compression engine then either (1) supplies the compressed frames to MAC 735 if the MAC needs a graphical data frame, or (2) stores the compressed frames in the memory to be retrieved at a later time by the MAC.

The MAC sets a flag in the RAM in order to inform the compression engine that it is ready for a graphical data frame. Hence, if the MAC's flag is set (indicating that the MAC is ready for data) then the compression engine sends the compressed data (e.g., the first compressed byte) to the MAC, which will then feed it to the radio transceiver for transmission. If the flag is not set, the compression engine determines that the MAC is not ready for receiving graphical data, and thereby stores the data in the RAM.

The MAC also retrieves from the memory the stored audio data for transmission via the digital transceiver. It synchronizes the visual and audio data components, so that they are presented synchronously at the home I/O node. Specifically, the MAC links the audio and the visual data (merges the two generated graphic and audio frames), in order to allow the computer system to provide a multimedia presentation. Linking the two data types is an important function because otherwise the video and audio would not be displayed in a synchronous fashion (i.e., lead to synchronization errors such as lip synch errors).

MAC 735 also interfaces with the digital transceiver to supply data to, and receive data from, it. In one embodiment of the invention, MAC 735 implements an isochronous protocol and is called an isochronous media access controller ("IMAC"). An IMAC is a communication controller that can handle time dependent data, such as audio and visual data. Isochronous data is typically transmitted through a connection oriented network (such as a fixed point-to-point network or a circuit-switched network). This controller's protocol is in contrast to other media access controller protocols which process the transmission of network data without guaranteeing delivery times or packet orders; non-isochronous protocols typically use a packet-switched network.

The MAC, like several other modules of the ASIC (such as the buffers 710, the graphic engine 715, the audio engine 720, the frame preparation engine 725, and the compression engine 730), couples to the interrupt (IRQ) line 745. The signal on this line is active whenever the MAC needs to inform the I/O driver of the computer that it has received an input command from the home I/0 node. This signal is also active whenever the system needs to be notified that the PCI card needs service. An interrupt controller (not shown) would then respond to the interrupt signal.

The operation of the ASIC is as follows. Initially, the circuitry of the ASIC is reset by asserting an active signal on a reset line (not shown) coupled to all the ASIC circuitry. Upon reset, the RAM is cleared and the memory controller is set back to a reset state. Also, upon reset, the PCI plug-in-play software (stored in storage 435) ensures the proper IRQ mapping and proper PCI address space mapping for card 615.

An application program then transmits a high-level graphical command for presentations at the computer I/O node and/or the home I/O node. This command is intercepted by an output driver (such as virtual output driver VOFD described below by reference to FIG. 13). If this intercepted command is also for a presentations at the home I/O node, this driver then forwards a copy of it to the PCI-mapped graphics buffer via the PCI bridge. The graphics engine then translates the display data command (such as a bit BLT command) to compose an image, which it then stores in the RAM.

Once the graphics engine stores a complete frame in the RAM (which serves as a frame buffer), a flag is set in the ASIC. After reset, the frame preparations engine periodically polls this flag to determine whether the RAM stores a composed frame. Once this flag is set, the frame preparation engine starts reading the frame line by line in order to perform digital filtering operations, such as audio-visual artifact correcting operations, image scaling operations, and flicker reduction operations.

After the frame preparation operations, the compression engine obtains the graphical frame in order to compress it. One embodiment of the compression engine, which uses an MPEG1 encoding scheme, maintains a non-compressed composed frame in the RAM. It then uses the non-compressed frame to compress subsequent frames. After the compression, the MAC obtains the compressed frame, prepares it for transmission, and supplies it to the digital transceiver for transmission to the home I/O node.

ASIC 700 processes audio data similarly. Specifically, in case where the application program (running on computer system 600) has audio components, drivers 435 receive audio commands and forward these commands to the audio buffer of the ASIC. In turn, the audio engine takes these audio commands, generates audio data from these commands, and then stores this data in the RAM. The audio data is then retrieved by the MAC, which synchronizes it with the graphical data, and supplies it to the transceiver.

Figure 5:
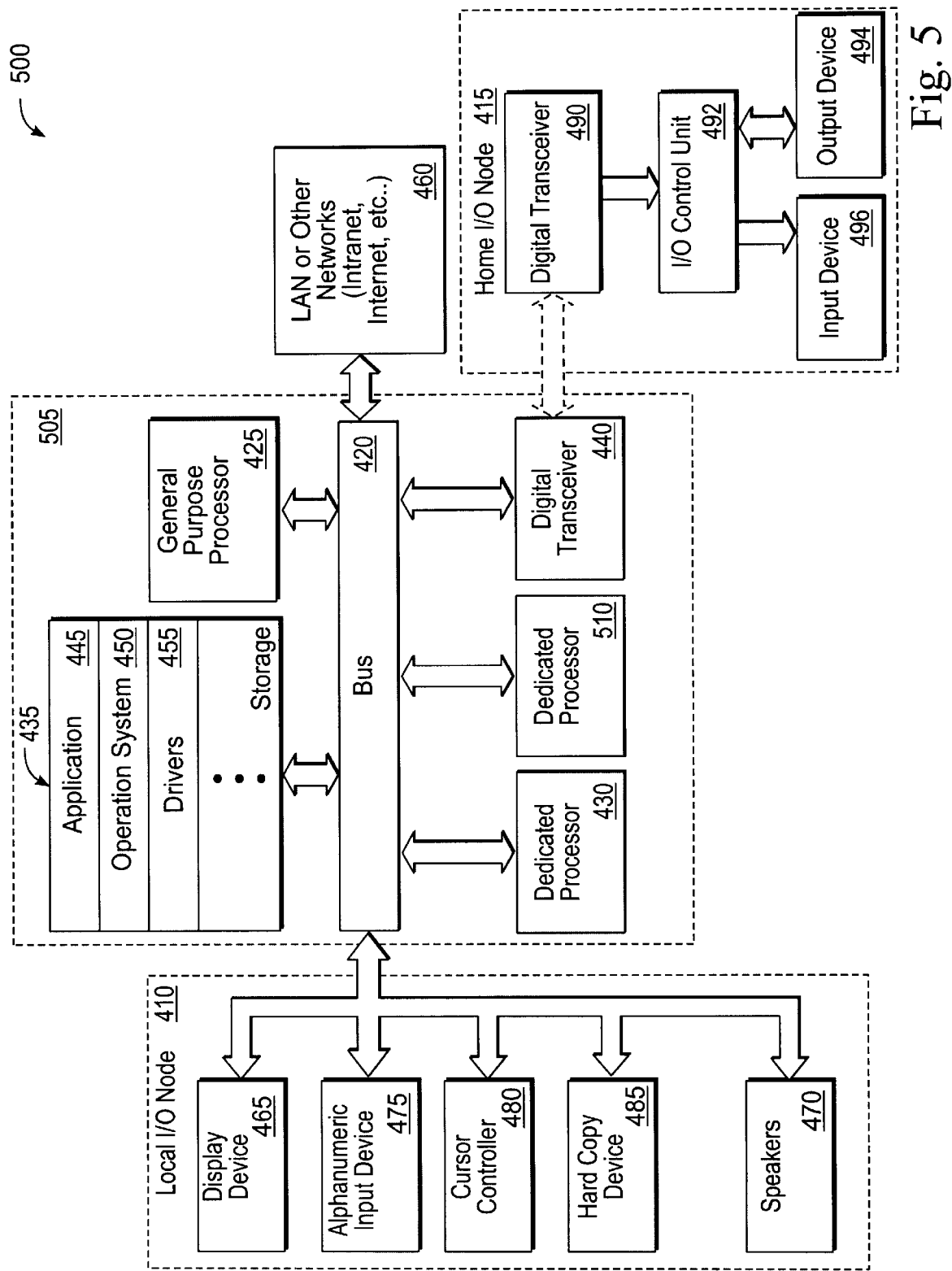
FIG. 5 presents another embodiment of the computer system of the invention.
Figure 8:
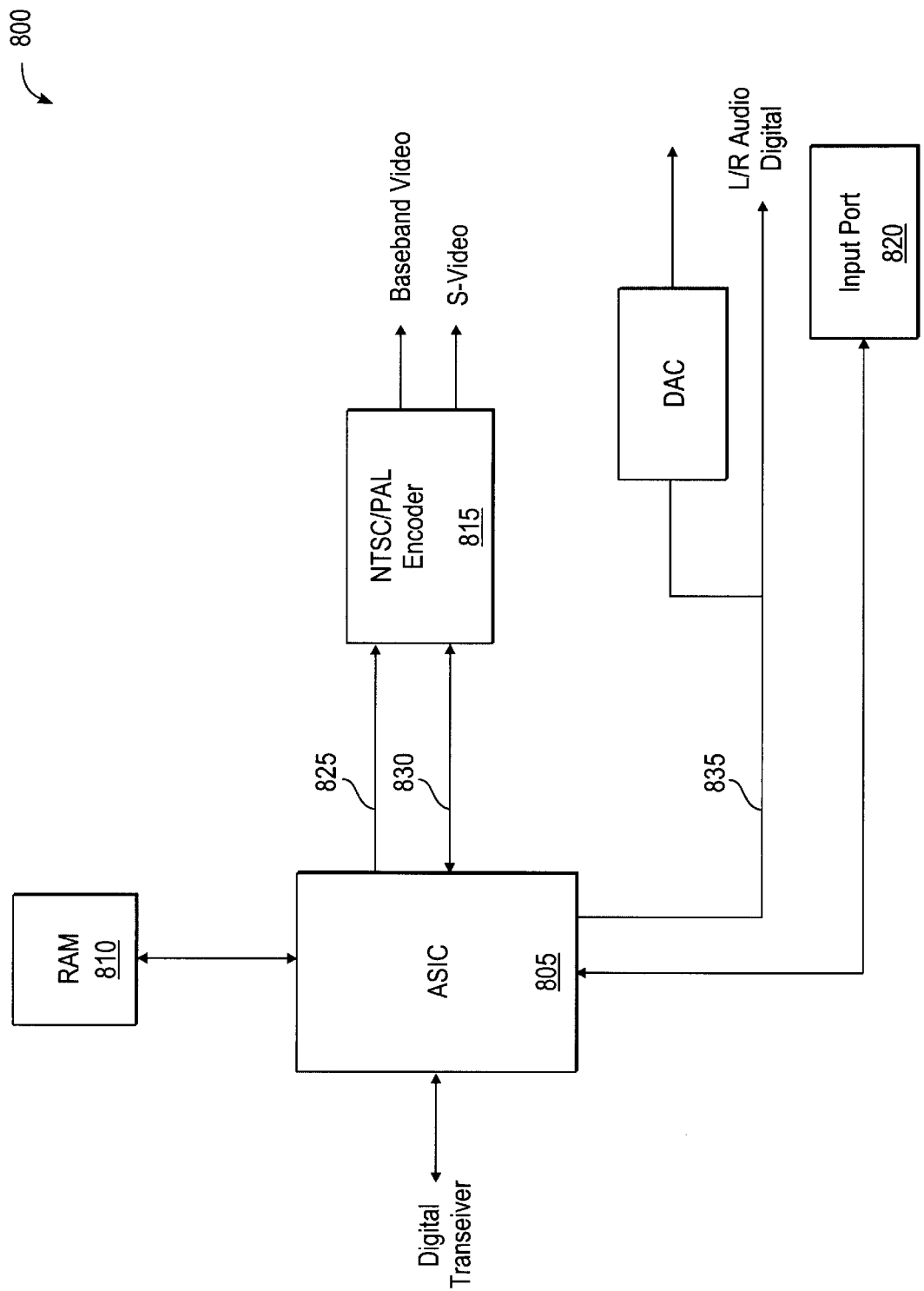
FIG. 8 presents one embodiment of the I/O control unit of one embodiment of the invention.

FIG. 8 presents one embodiment of the I/O control unit 492 of the home I/O node of FIGS. 4–6. This embodiment can couple to a television and speakers at the home I/O node. In one embodiment of the invention, I/O control unit 800 is part of a settop box which connects to a television. One such settop box is accompanied by wireless keyboard and cursor controller, which serve as the input devices for the home I/O node.

As shown in FIG. 8, this control unit includes ASIC 805, RAM 805, NTSC/PAL encoder 815, input port 820. This control unit couples to digital transceiver 490, which in one embodiment of the invention is a spread-spectrum radio transceiver. This transceiver transmits signals to, and receives signals from, digital transceiver 635 of computer 605. In turn, this transceiver receives signals from, and supplies signals to, ASIC 805.

More specifically, the transceiver supplies received signals to ASIC 805. In one embodiment of the invention, the transceiver receives composed and compressed audio-visual data. In this embodiment, the ASIC decompresses the audio-visual data prior to presentation. As mentioned above, the compression engine of one embodiment of the invention uses an MPEG1 encoding scheme. Hence, for this embodiment of the invention, ASIC 805 obtains the audio-visual data by performing an MPEG 1 decoding operation.

ASIC 805 also couples to RAM 810 and input port 820. It uses the RAM to store signals received from transceiver 490 and input port 820. Furthermore, through the input port, the ASIC receives information from a user of the home I/O unit. In particular, this port receives signals from the home node's input devices (such as a cursor controller, keyboard, etc.), converts these signals into digital data, and then supplies them to the ASIC. In one embodiment of the invention, this interface is either a wireless transceiver (such as an infrared or radio transceiver) or a wired port.

The ASIC then formats for transmission the information it received from the input port, and supplies the formatted data to transceiver 490 to transmit across the wireless channel to computer 605. This transmitted information causes the computer to perform certain operations, which in turn can affect the audio-visual presentation viewed by the user at the home node.

ASIC 805 further couples to encoder 815. This encoder (1) receives the digital visual information previously decoded by ASIC 805, and (2) converts this digital information into an analog format. Specifically, in one embodiment of the invention, encoder performs a matrix encoding process by taking digital YCrCb representations and realizing the complex encoding of either NTSC standard or PAL standard.

This encoder couples to the ASIC via unidirectional signal link 825 and bi-directional control link 830. Through the unidirectional link, the ASIC provides data to encoder 815. The ASIC uses the control link to transmit and receive control signals (such as horizontal sync, vertical sync, even/odd frame, etc.) to and from the encoder. ASIC 805 also couples to audio data link 835, which provides the audio output of the ASIC. This audio link also connects to a digital-to-analog converter ("DAC") 845, which converts the received digital audio to an analog format and thereby provides an analog audio output.

Figure 9:
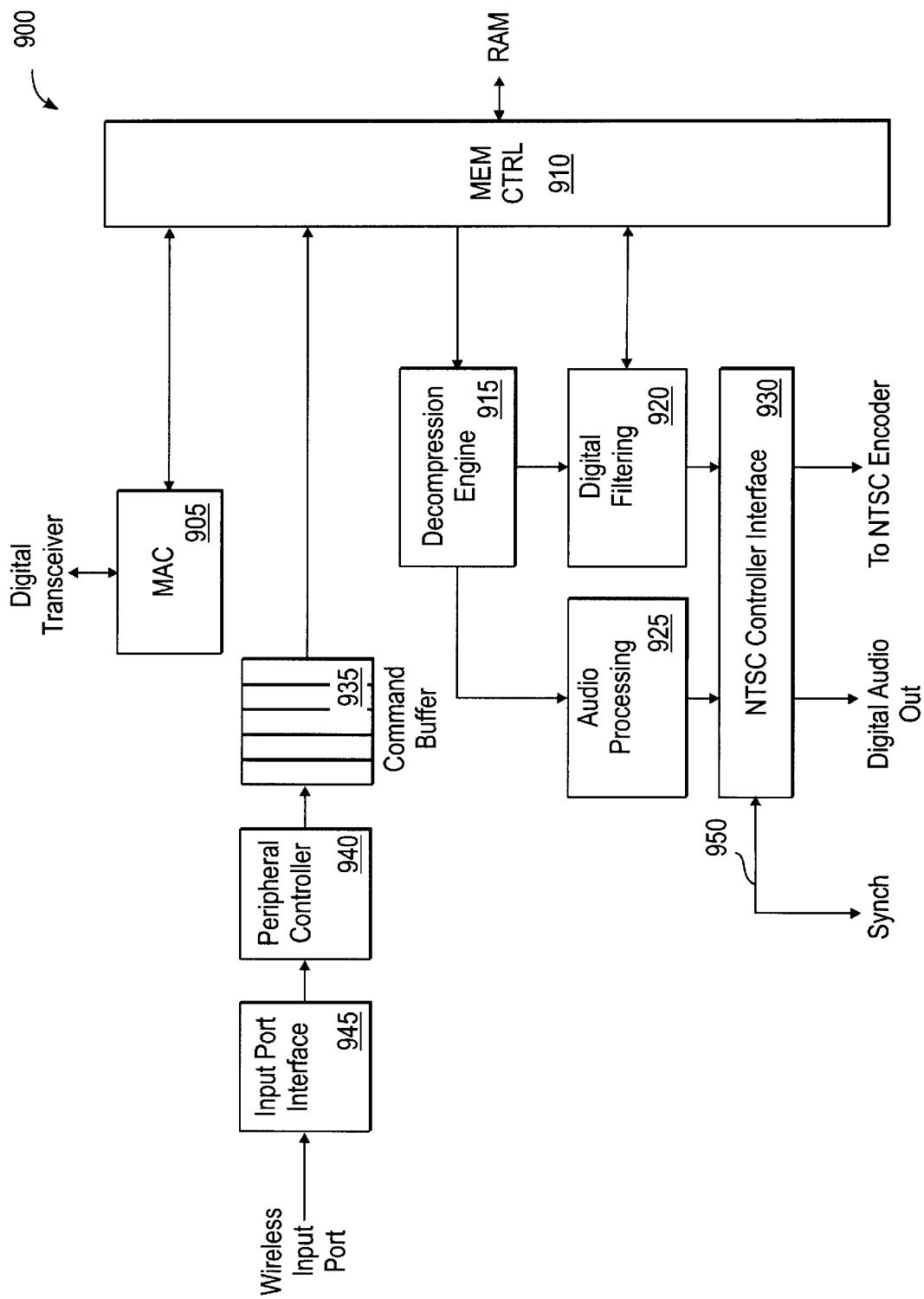
FIG. 9 presents one embodiment of an ASIC of FIG. 8.

FIG. 9 presents one embodiment of ASIC 805 of FIG. 8. As shown in FIG. 9, ASIC 900 includes MAC 905, memory controller 910, decompression engine 915, digital filtering engine 920, audio processing engine 925, NTSC controller interface 930, command buffer 935, peripheral controller 940, and input port 945.

MAC 905 controls the flow of information to and from digital transceiver 940 through a bi-directional link. One embodiment of MAC 905 is an IMAC. The MAC deposits transmitted signals in, or pulls the received signals out of, RAM 810 through memory controller 910, which acts as an interface between RAM 810 and the circuitry of ASIC 900.

More specifically, in certain instances, the MAC retrieves information from RAM 810, and supplies the retrieved information to transceiver 490 for transmission back to computer 605. For instance, if a user of the home I/O node transmits a signal to I/O control unit, the MAC obtains the transmitted information stored in RAM 810 and forwards it to computer 605 via transceiver 490.

As mentioned above, input port 820 (which can be a wireless infrared transceiver) receives the signals transmitted by the home node's user. This port then supplies the transmitted signal to input interface 945. In one embodiment, this interface is an infrared devices association ("IRDA") interface. This device uses a standard protocol for infrared devices to identify the home node's input device that transmitted the signal, and to convert the transmitted infrared signal to digital data readable by ASIC 900.

The digital data then is supplied to peripheral controller 940, which may either be fixed function logic or microcontroller for interpreting the data and identifying the input signal (e.g., identifying the keystroke or mouse movement). The controller then stores the identified input signal in command buffer 935, which under the control of memory controller 910 eventually forwards the received input signal to RAM 810. The command buffer is provided just in case the received input signals cannot be stored immediately in the RAM (e.g., in case the RAM is being accessed by another unit, such as when a frame is being stored in the RAM). Once an input signal is stored in the RAM, a flag is set (by the peripheral controller) to alert the MAC that it needs to retrieve input commands from RAM 810 and forward them to transceiver 490.

MAC 905 also forwards all the information transmitted form digital transceiver 490 into memory 810 via memory controller 910. Once the MAC stores a complete frame in the memory, it sets a flag in the memory to indicate that a complete frame has been received from the transceiver. The decompression engine then detects the setting of the flag and accesses the RAM via the memory controller to retrieve the received, compressed information. The decompression engine then decompresses this information, by performing the inverse function of the compression function (e.g., performing MPEG decompression) used at the computer 605.

The decompression engine then supplies the decompressed information to a digital filtering engine 920, which uses one or more digital filtering processes to correct any audio-visual artifacts introduced during the transmission. One version of the decompressed and digitally-filtered information is then stored back in the DRAM. The decompression engine uses this version to decompress subsequent frames. Another version of the decompressed and digitally-filtered frame is supplied to controller interface 930, which serves as a control interface with encoder 815. This output of digital filtering engine 920 is also placed on link 840, as discussed above.

The decompression engine also couples to audio processing engine 925. The audio processing engine extracts the audio sequence and corrects errors in the audio stream. The output of the audio processing engine is then supplied to the controller interface. The controller interface assures that the signals it supplies to encoder 815 comply with this encoder's specifications. This interface also maintains the synchronisity between the audio frame output of the audio engine and the video frame output of the digital filtering engine, by using the synch control signal 950 supplied by encoder 815 The synch control signal is a basic set of timing signals consistent with the specification of encoder 815 (e.g., with the NTSC specification).

The operation of ASIC 900 during reception of signals from computer 605 will now be described. When the I/O control unit resets, the storage locations in the RAM are resets to clear states. The controller interface would then begin receiving synchs simultaneous to the display device allowing audio sample clock to align for later first reception of audio (audio would remain muted until such time).

The synch signals start the operation of ASIC 900, by causing the decompression engine to start looking to the RAM to determine if a flag has been set by the MAC to indicate that a complete frame has been received and stored. Once a flag is set, the decompression engine would retrieve a frame to decompress it.

After a predetermined amount of information has been decompressed, the digital filtering process begins. The digital filter generates a first type of information for display by accessing the streaming information coming from the decompression engine and the stored parameters (from the memory) needed to reconstruct the frame for display.

Similarly, after a predetermined amount of information has been decompressed, the audio engine begins processing the decompressed audio information, which it supplies to the controller interface. This process would continue in a pipe-line fashion throughout the reception of the frame, whereby the MAC stores the compressed information in memory, the decompression engine accesses this information and decompresses it, the filtering engine processes the visual-portion of the decompressed information with parameters it obtains from the memory, and the audio engine process the audio portion of the decompressed information.

Figure 10:
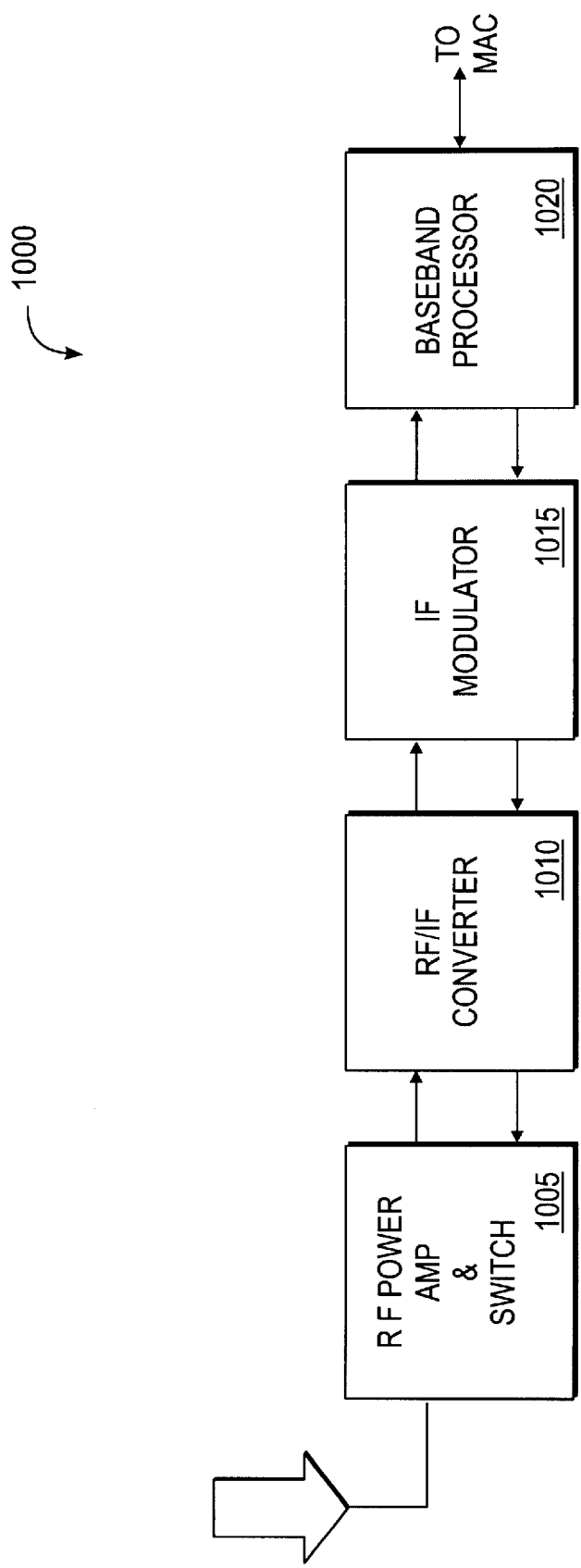
FIG. 10 presents one embodiment of a digital transceiver of the invention.

FIG. 10 presents one embodiment of digital transceivers used in the invention. As shown in this figure, one embodiment of digital transceiver 1000 includes power amplifier 1005, frequency converter 1010, modulator/demodulator 1015, and baseband processor 1020. The baseband processor couples to the MAC, which implements the wireless protocol of the transceiver. This controller transmits data to, and receives data from, the baseband processor, which prepares the data stream for transmission. For the embodiments of the transceiver 1000 which utilize spread-spectrum technology, processor 1020 performs pseudo-noise code spreading. It also provides scrambling for interference rejection, antenna diversity for better coverage, and received signal strength indication.

The output of the baseband processor is supplied to modulator 1015. This intermediate frequency ("IF") modulator then encode and modulates the baseband data to place the data in an intermediate frequency range (e.g., uses QPSK encoding to modulate the data between 200 MHz and 400 MHz). The encoded and modulated data is then pushed to a higher frequency range (e.g., 2.4 GHz, which is the allowed, unlicensed spread spectrum frequency band) by up-converter 1010. The high-frequency data is then amplified by power amplifier 1005 and transmitted via an antenna.

Transceiver 1000 operates in a complementary fashion when it receives a signal. Specifically, the antenna supplies the received signal to low noise amplifier 1005 to amplify the signal. The high-frequency, amplified signal is then converted to an intermediate frequency range by down-converter 1010. The IF modulator/demodulator 1015 demodulates and decodes the filtered, intermediate-frequency signal to obtain a baseband signal, which it supplies to baseband processor 1020. After processing this signal, this processor then notifies the MAC that it has received data.

Figure 11:
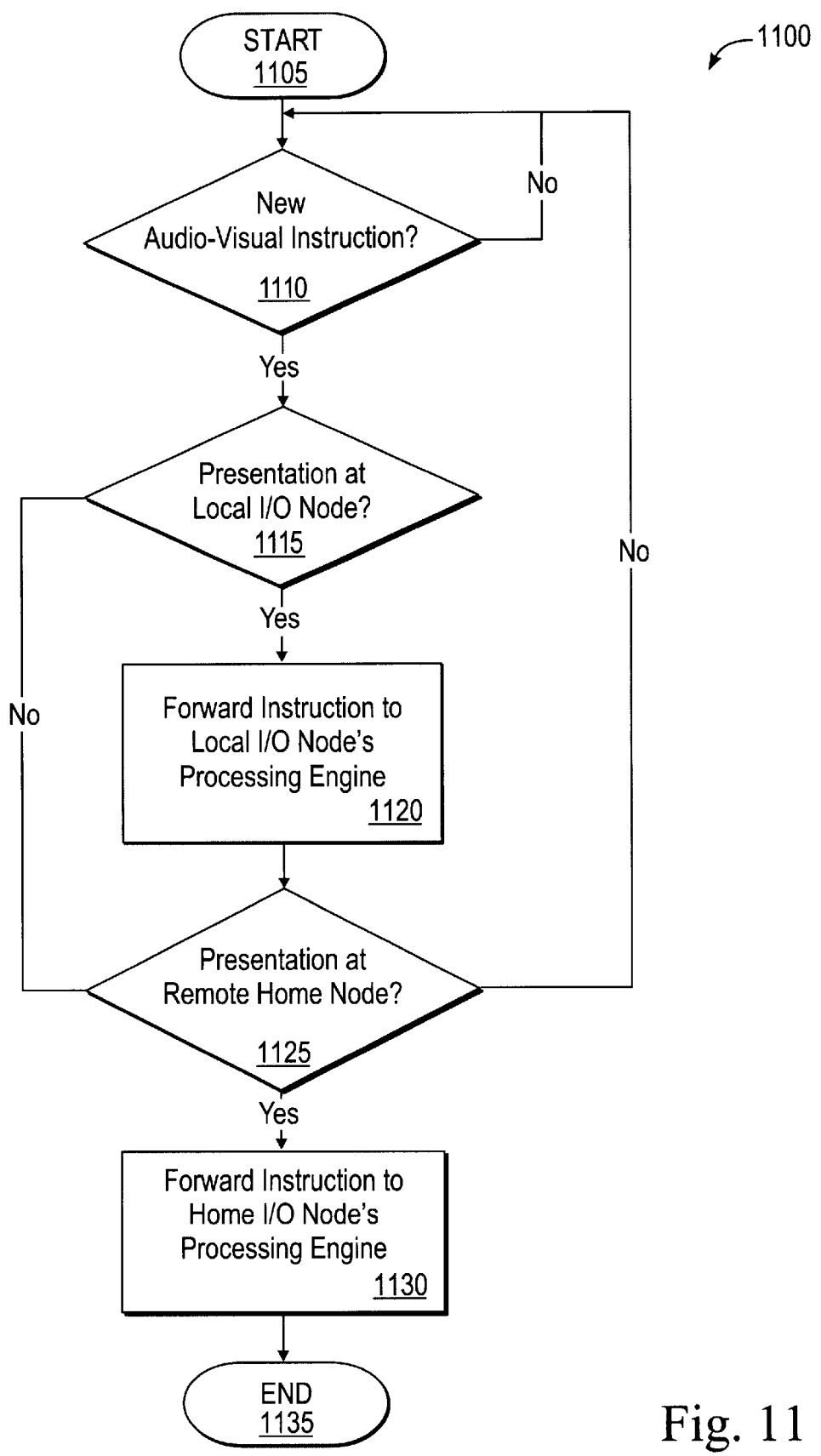
FIG. 11 presents a flow chart of the software of one embodiment of the invention.

FIG. 11 presents a flowchart of the software for one embodiment of the invention. This process can be implemented as part of the application program, the operating system, and/or the I/O drivers. Process 1100 of FIG. 11 starts at step 1105 when the computer is turned on.

The process then transitions to step 1110, where a determination is made whether a new audio-visual instruction has been received. For instance, one embodiment of process 1100 makes this determination by checking the setting of a flag at a memory location. If no new instruction has been received, the process transitions back to step 1110 to check for a new instructions arrival in the next time interval.

However, if a new instruction has been received, the process then determines, at step 1115, whether a presentation is being presented at the local I/O node. If not, the process transitions to step 1125. If so, the process forwards the instruction to the local I/O node's processing engine, at step 1120. Based on the audio-visual instruction, the local I/O node's processing engine then composes an audio-visual data stream for presentation at the local node.

Next, the process transitions to step 1125. At this step, a determination is made whether the a presentation is being presented at the remote home I/O node. If not, the process transitions back to step 1110 to check for a new instructions arrival in the next time interval. On the other hand, if received audio-visual instruction is also for a presentation at the remote I/O node 415, the process forwards the instruction to the remote I/O node's processing engine, at step 1130. The remote I/O node's processing engine then composes an audio-visual data stream (based on the audio-visual instruction) for presentation at the home I/O node. As discussed above, this processing engine either is a part of the computer (e.g., is part of a processor or an ASIC) or it is a part of the logic at the home I/O node (e.g., is part of I/O control unit 492).

From step 1130, the process transitions step 1135 where it terminates this cycle. In the next cycle, process 1100 returns to step 1110 to check for a new instructions arrival in the next time interval. The process continues to cycle until the computer or remote node is turned off.

Figure 12:
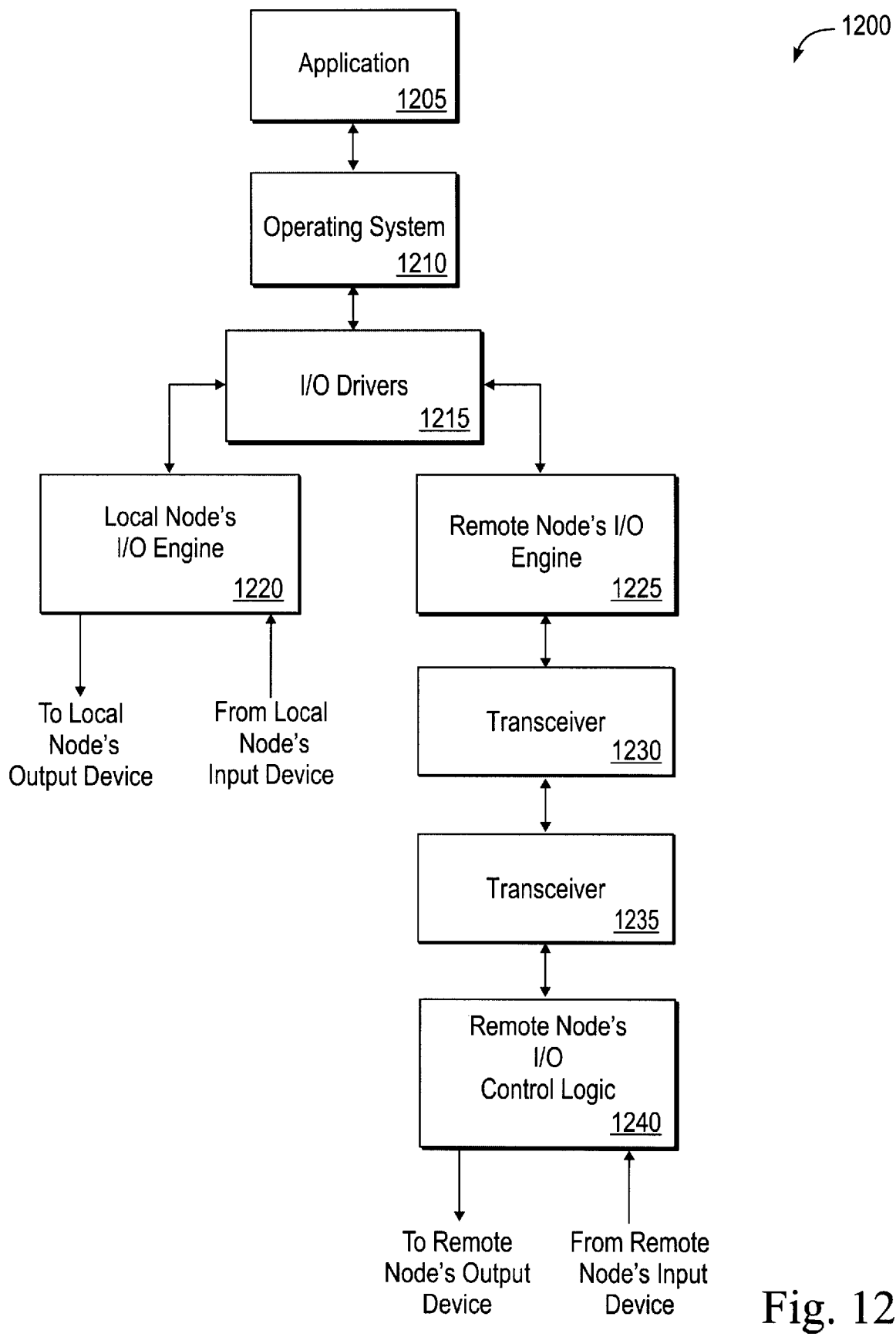
FIG. 12 presents a general operational flow for one embodiment of the invention.

FIG. 12 presents the general operational flow of one embodiment of the invention, in which the above-described process 1100 of FIG. 11 is performed by I/O drivers. In this embodiment, application program 1205 first generates a high level audio-visual command, which it supplies to operating system 1210. The operating systems then converts the high level commands to audio-visual primitives, and forwards these primitives to I/O drivers 1215.

The I/O drivers then decide whether a presentation is being presented at the local I/O node. If the audio-visual instructions are directed to the local I/O node, drivers 1215 route them to the local I/O processing engine. This engine, in turn, composes audio-visual data based on the instructions and forwards the data to the local node for presentation at the local output device. For instance, based on received instructions, the local I/O engine can prepare digital RGB frames, which are then converted to analog RGB data to drive the electron gun of the cathode ray tube ("CRT") of a PC monitor at the local node.

If the instruction is not directed to a presentation at the local I/O node (i.e., if no presentation is being presented at the local I/O node) or if it is also directed to a presentation at the remote I/O node, drivers 1215 then route it to the remote I/O node's processing engine. One of ordinary skill in the art would realize that, even though FIG. 12 pictorially presents two different I/O processing engines, in one embodiment of the invention these two processing engines share the same hardware engine while utilizing non-identical software (i.e., while utilizing different instruction sequence).

Based on the received audio-visual command, one embodiment of remote I/O node's processing engine 415 composes audio-visual data for presentation at the remote I/O node. For instance, based on received high-level graphic commands, one embodiment of the home I/O node's I/O engine composes digital YCrCb data. The computer's digital transceiver then transmits the composed audio-visual data to the home I/O node.

The remote node's transceiver then receives the transmitted data, which it passes to the home I/O node's I/O control unit. This control unit decodes the received signal to extract the composed audio-visual data. One embodiment of the I/O control unit also encodes the extracted audio-visual data in a unique format for presentations at the remote output device. For example, in one embodiment of the invention, I/O control unit receives YCrCb signals, and converts these signals to NTSC or PAL encoded signals for display on the television.

An alternative embodiment of the home I/O node's I/O processing engine does not compose the audio-visual data for the remote I/O node, but rather transmits the audio-visual commands to the remote I/O node. In this embodiment, I/0 control unit 492 I/O first decodes the received signal, and then composes audio-visual data based on it.

In yet another embodiment of the invention, home node I/O processing engine transmits particular audio-visual commands to the home I/O node's I/O control unit, while also composing and transmitting audio-visual data based on other audio-visual commands. In this embodiment, the I/O control unit extracts the received commands and data, and composes additional audio-visual data based on the extracted commands.

Figure 1:
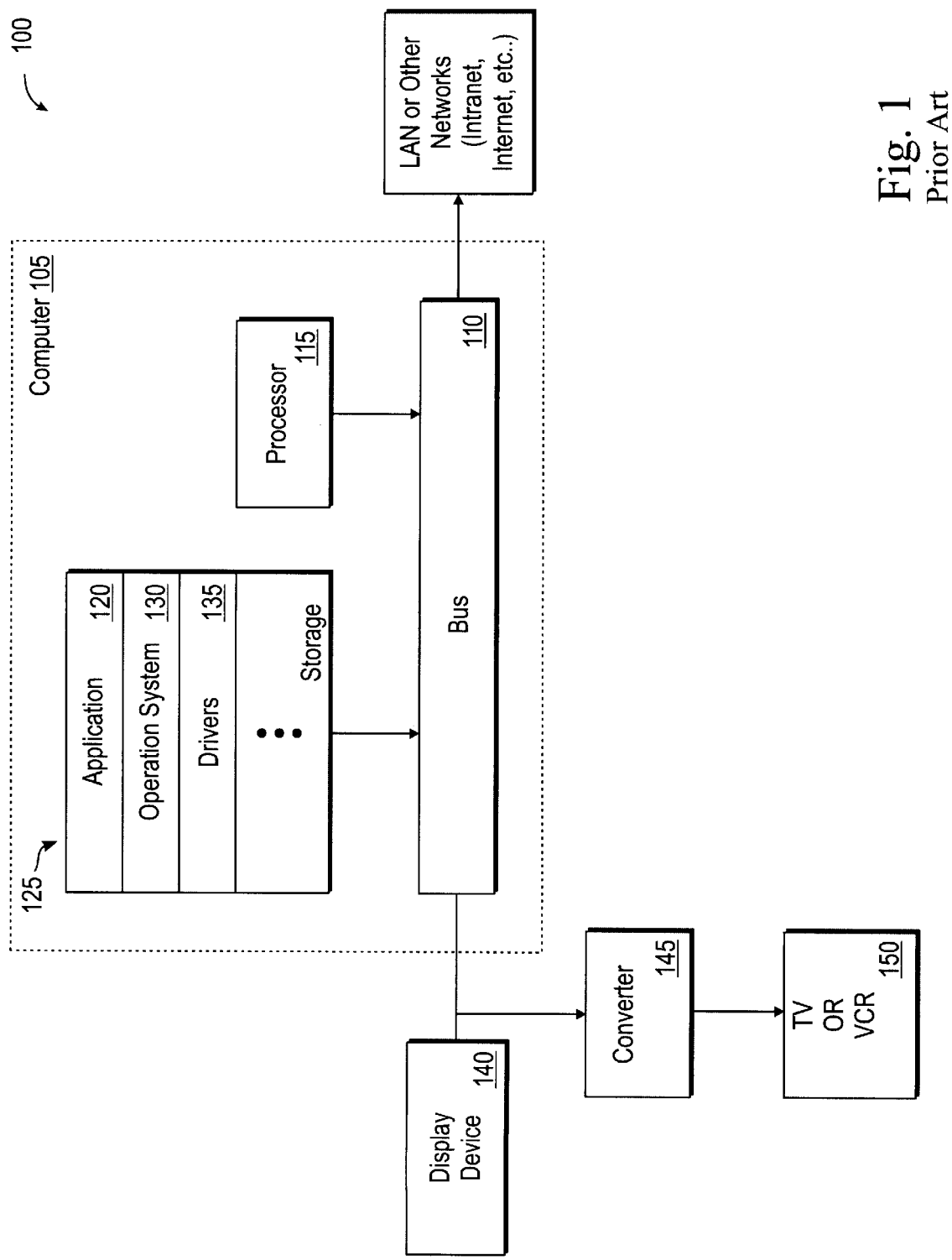
FIG. 1 presents one prior art system for coupling a computer to a television or a VCR.
Figure 2:
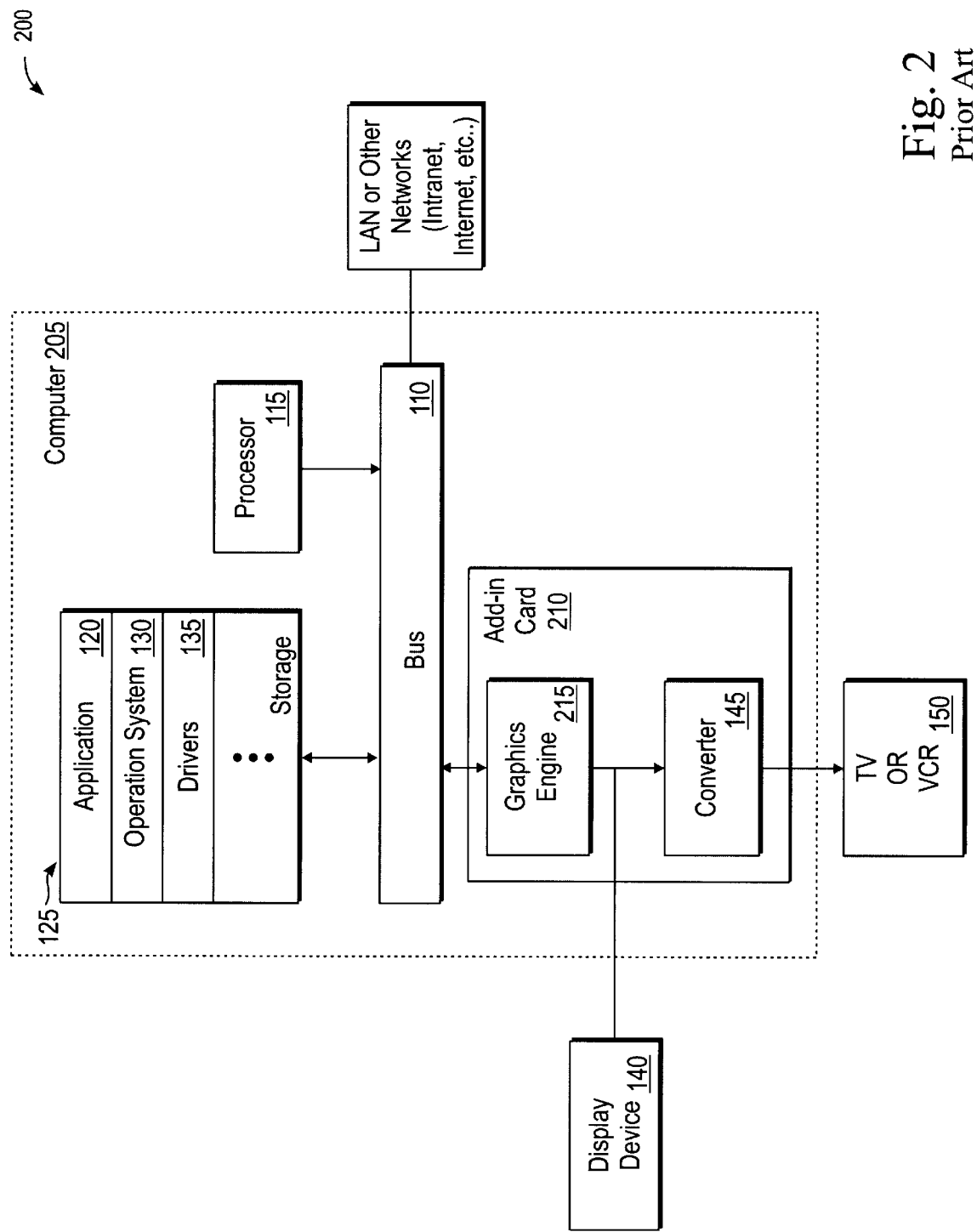
FIG. 2 presents another prior art system for coupling a computer to a television or a VCR.
Figure 3:
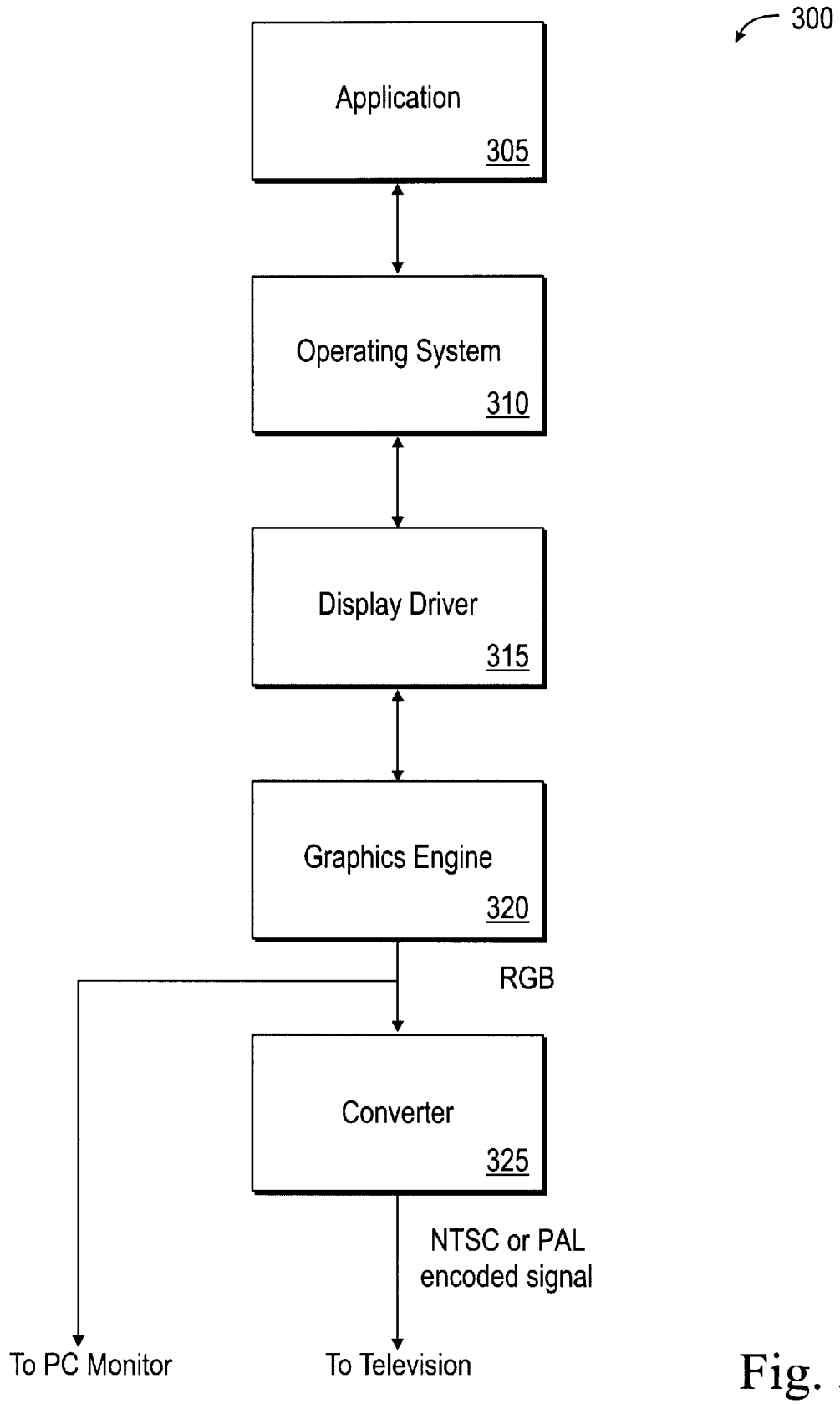
FIG. 3 presents the general operational flow of the prior art system of FIGS. 1 and 2.

Thus, as shown in FIG. 12, one embodiment of the invention taps out the information for the home I/O node at an earlier operational stage than the prior art systems of FIGS. 1 and 2. Hence, unlike the prior art systems, one embodiment of the invention does not generate the I/O data for presentation at the home I/O node by intercepting and converting the I/O data for presentation at the local node. Rather, one embodiment of the invention intercepts the audio-visual commands before they have been processed for the local node, and forwards them to the unique I/O processing engine of the home I/O node.

In this manner, the presentation presented at the home I/O node has superior quality, because it is composed in a output type sensitive fashion. Specifically, the presentation at the home I/O node has not been generated based on a presentation for the particular output devices at the local node, but rather has been specifically tailored for the output devices at the home I/O node.

For example, when the local node's output device is a PC monitor and the home I/O node's output device is television, the television's NTSC or PAL presentation is not based on analog RGB signals generated for the PC monitor. Rather, this display has been specifically composed from the audiovisual commands for the television. For instance, in one embodiment of the invention, the home node's I/O engine composes YCrCb digital display data from graphical instructions.

Figure 13:
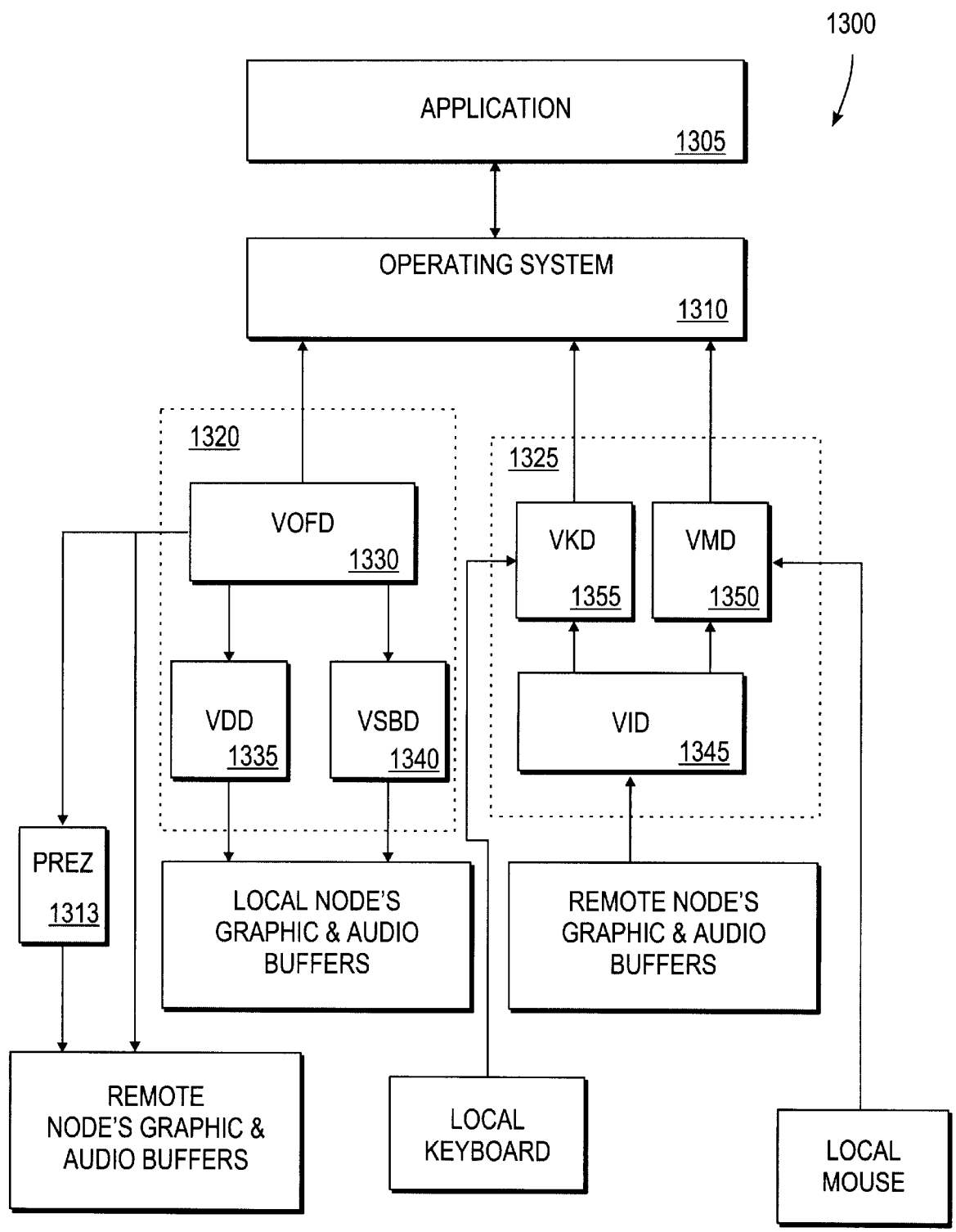
FIG. 13 sets forth the software architecture of one embodiment of the invention.

FIG. 13 sets forth the software architecture of one embodiment of the invention. This embodiment leverages functionality found in existing operating systems (such as Windows 95®), by utilizing its native display, sound, keyboard, and mouse drivers. This embodiment includes an application program 1305, an operating system 1310, a number of I/O drivers, and a dynamic link library 1315.

The application program performs certain types of tasks by manipulating text, numbers, and/or graphics. Examples of such a program include word processing programs, such as Microsoft Word®, or a multi-media game program, such as Nascar Auto-Racing®. Application program 1305 interfaces with the components and modules of the computer through operating system 1310. Examples of such an operating system include Microsoft Windows 95® and Microsoft NT®. The operating system serves as the foundation on which application programs operate and controls the allocation and usage of hardware and software resources (such as memory, processor, storage space, peripheral devices, drivers, etc.). As shown in FIG. 13, operating system 1310 serves as the interface between application program 1305 and I/O drivers. Thus, the application program transmits and receives instructions to and from the drivers via the operating system.

The software for performing I/O tasks is usually organized into device drivers. Drivers are control programs that enable a computer to work with output devices (i.e., provide the instructions necessary for controlling the I/O devices). They are called by the application program whenever I/O processing is required. Even though FIG. 13 presents the drivers as separate modules than the operating system, one of ordinary skill in the art would realize that, in one embodiment of the invention, some or all of these device drivers are operating system subroutines. Also, one of ordinary skill in the art would realize that certain drivers accompany the application programs.

Drivers include an output set of drivers 1320 for regulating the operation of output devices, such as display devices and printers, and input set of drivers 1325 for regulating the operation of input devices, such as the keyboard and the cursor controllers.

Output Set of Drivers

For the embodiment shown in FIG. 13, the output set of drivers include VOFD 1330, VDD 1335, and VSD 1340. VOFD stands for virtual output filter driver. This driver is responsible for passing a copy of the audio and graphics calls, which the operating system invokes for audio-visual presentations at the local node, to the home I/O node's I/O processing engine, if the received instruction is also for a presentation at the remote I/O node.

VDD and VSD respectively stand for virtual display driver and virtual sound driver, and are device-specific control programs for respectively regulating the operation of the display device and the speakers. In one embodiment of the invention, VDD and VSD are standard device drivers accompanying the Windows 95® operating system.

The operation of the output drivers will now be described. Initially, the application program issues a high level audio-visual instruction (e.g., line draw) for a presentation at one or both of the I/O nodes. Depending on whether the instruction is an audio instruction or a video instruction, the operating system then issues an audio call or a graphics call to invoke either VSD or VDD to write to the audio engine or the graphics engine of the I/O processing engine.

In one embodiment of the invention, these calls, in turn, first cause the VOFD driver to be invoked. For this embodiment, the pseudo code relating to one embodiment of VOFD is recited below.

```
Pseudo Code for VOFD
if Graphics_Call then
begin
    If TextOut then
    begin
            Read Text_Attribute
            VxDcall Prez_TextRemap
    end
    Write Remote_Display_Reg
end
else if Audio_Event then
    begin
            If MIDI then
                read MIDI_Interface
            else
                read Audio_Attribute
            Write Remote_Audio_Reg
    end
end
clear_flags
RET
```

VOFD forwards the graphic call (e.g., the graphical device interface, GDI, call in Windows® or the audio call to the graphics engine or audio engine of the local node. As apparent from the pseudo code recited above, this driver also forwards copies of the graphics and audio calls to the graphics and audio engines of the home I/O node. In addition, if this driver detects graphical text string calls (e.g., GDI text string calls), it invokes Prez.dll for post processing text in order to prepare it for display on the remote display terminal (e.g., post processing text for TV compliant display).

Specifically, VxDcall Prez_TextRemap command invokes Prez.dll for post processing text to be compliant with the display standards of the remote display terminal. Thus, once the VOFD determines that the application's command is a graphics text string call, it invokes Prez.dll to perform the remapping that is necessary for displaying the text intended for the local display device on the remote display device. This remapping can include font color remapping, font type remapping, font rescaling, etc. Prez.dll then writes the remapped instructions in the graphics processing engine. VOFD then writes a copy of the graphics call to graphics engine of the home I/O node's I/O processing engine.

On the other hand, if VOFD determines that the OS call is an audio instruction, and if the driver determines that the audio instructions are in a MIDI (i.e., a musical instrument digital interface) format, it the reads the MIDI_Interface to obtain the audio content. Otherwise, it reads the audio attribute contained in the Audio_Event instruction. In either case, VOFD then writes the audio content (obtained from the MIDI interface or the audio instruction) in the audio engine of the home I/O node's I/O processing engine. Finally, VOFD clears the flags (e.g., the flag that causes VOFD to be called) and resets to await for additional audio-visual instructions.

Input Drivers

For the embodiment shown in FIG. 13, the input set of drivers includes VID 1345, VKD 1355, and VMD 1350. VID stands for virtual input driver. This driver services remote input devices, by passing the data from the remote I/O nodes to the application program via VKD, VMD, and the operating system. The data from the local I/O node is directly serviced by VKD and VMD.

VKD and VMD respectively stand for virtual keyboard driver and virtual mouse driver, and are device-specific control programs for respectively regulating the operation of the keyboard and the mouse. In one embodiment of the invention, VKD and VMD are standard device drivers accompanying the Windows 95® operating system.

The operation of the input drivers will now be described by reference to the pseudo code for one embodiment of VID driver recited below.

Pseudo Code for VID

```
if PCCARD_IRQ then
begin
    Read Remote_IQ_reg
    if Keyboard_Activity then
    begin
        Read ScanCode
        Read RepeatCount
        Read ShiftState
        VxDcall VKD_API_Force_Key
    end
    else if Mouse_Activity then
    begin
        Read AbsoluteX
        Read AbsoluteY
        Read ButtonStatus
        VxDcall VMD_Post_Absolute_Pointer_Message
    end
end
clear_flags
RET
```

As set forth in the pseudo code recited above, one embodiment of VID starts once PCCARD_IRQ signal is active. The VID then reads the data in the I/O register of the remote processing engine. If this data pertains to a keyboard activity at the home I/O node (e.g., a flag has been set to indicate that the data relates to a keyboard activity), the driver then extracts the scan code, repeat count, and shift state from the keyboard data. It then forwards this extracted information to the application program via VKD and the operating system. In other words, VID invokes VKD in order to use the standard application programming interfaces (APIs) exported by the VKD to forward the extracted data to the application program.

On the other hand, if the data in the I/O register of the remote processing engine pertains to a mouse activity, VID extracts the cursor positional data (absolute X and absolute Y) and the button value data from the I/O register data. This driver then invokes VMD to use its standard APIs to forward the extracted data to the application program. Finally, VID clears the flags (e.g., the flag that causes VID to be called) and resets to await for additional input commands.

As apparent from the discussion above, the invention is advantageous because it provides a wireless home computer system which efficiently uses a computer in the home environment. This invention uses the ever-increasing computational capabilities of a computer to drive a home I/O unit.

It also uses superior digital wireless communication link. Several embodiments of the invention utilize direct sequence coding, spread spectrum link. Such a link has a high degree of immunity from interference noise (such as intra-cell interference noise generated in the communication cell formed around the periphery of the computer and the home I/O node, or inter-cell interference noise generated by noise sources outside of the communication cell formed by the computer and the home I/O unit).

A direct sequence coding spread spectrum link also provides protection against the multipath phenomena, because the multipath signals appear as uncorrelated noise to the spread spectrum receiver. Thus, when such a link is used, the quality of the transmitted I/O data and the output presentation is not deteriorated. The embodiments of the invention that utilize other digital transceivers, guard against signal degradation due to noise by performing error coding and decoding.

Many embodiments of the invention also provide a secure digital communication link. For example, the embodiments of the invention that utilize direct sequence coding spread spectrum links, utilize encoding codes to spread the signals over the available bandwidth, and transmits data in this encoded fashion. Only the receiver has the encoding code, and thus only the receiver can decode the transmitted data. Thus, eavesdroppers cannot tap into the communications between the computer and the home node. Protection against eavesdroppers is also an advantage of the embodiments of the invention that utilize other digital transceivers which transmit and receive encrypted data.

Also, one embodiment of the invention taps out the information for the home I/O node at the command level and not the data level of the prior art. Hence, unlike the prior art systems, one embodiment of the invention does not generate the I/O data for presentation at the home I/O node (e.g., does not generate analog NTSC or PAL encoded signals for a television) by intercepting and converting the I/O data for presentation at the local node (e.g., intercepting and converting the analog RGB signals for a PC monitor). Rather, for the home I/O node, one embodiment of the invention intercepts the audio-visual commands before they have been processed for the local node, and forwards them to the unique I/O processing engine of the home I/O node.

In this manner, the presentation presented at the home I/O node has superior quality, because it is composed in a output type sensitive fashion. Specifically, the presentation at the home I/O node has not been generated based on a presentation for the particular output devices at the local node, but rather has been specifically tailored for the output devices at the home I/O node.

For example, when the local node's output device is a PC monitor and the home I/O node's output device is television, the television display is not based on analog RGB signals generated for the PC monitor. Rather, this display has been specifically composed from the graphics commands for the television. For instance, in one embodiment of the invention, the home node's I/O engine composes YCrCb digital display data from graphical instructions.

While the invention has been described with reference to numerous specific details, one of ordinary skill in the art would recognize that the invention can be embodied in other specific forms without departing from the spirit of the invention. For example, even though some of the above-discussed embodiments (e.g., the embodiment set forth in FIG. 4) have been described as processing audio-visual data and commands, one of ordinary skill in the art would appreciate that alternative embodiments of the invention process other types of multi-media data and commands (such as tactile data and commands).

Moreover, while FIG. 7 presents a specific example of the ASIC of FIG. 6, other embodiments of the ASIC of FIG. 6 perform different tasks than the ones performed by ASIC 700. For instance, the compression operation can be performed outside of ASIC 620. Thus, one of ordinary skill in the art would understand that the invention is not to be limited by the foregoing illustrative details, but rather is to be defined by the appended claims.

We claim:

1. A digital wireless home computer system comprising:
   (a) a computer having a communication module including a first isochronous media access controller (IMAC) with a first digital wireless transceiver coupled thereto; and
   (b) a home input/output node comprising:
      (1) a second digital wireless transceiver configured to communicate with the first digital wireless transceiver,
      (2) an output device communicatively coupled with the second digital wireless transceiver, the output device configured to provide an output presentation based on signals received from the computer via the first and second digital wireless transceivers,
      (3) an input device communicatively coupled with the second digital wireless transceiver, the input device configured to receive input signals from a user interfacing with the home input/output node, at least some of the input signals to be forwarded to the computer via the first and second digital wireless transceivers, and
      (4) an input/output control unit communicatively coupling the second digital wireless transceiver with the input and output devices through a second IMAC, and configured to format signals for presentation at the output device and for transmission via the second digital wireless transceiver.

2. The digital wireless home computer system of claim 1, wherein the first and second digital wireless transceivers are digital radio frequency ("RF") transceivers.

3. The digital wireless home computer system of claim 1, wherein the first and second digital wireless transceivers are spread spectrum transceivers.

4. The digital wireless home computer system of claim 1, wherein the first and second digital wireless transceivers are configured to communicate based on a real-time protocol.

5. The digital wireless home computer system of claim 1, wherein the computer is configured to transmit multi-media data to the home input/output node via the first and second digital wireless transceivers.

6. The digital wireless home computer system of claim 5, wherein the computer is configured to transmit via the first and second digital wireless transceivers, multi-media data on a real-time basis to the home input/output node.

7. The digital wireless home computer system of claim 1, wherein the computer is configured to transmit graphics data to the home input/output node.

8. The digital wireless home computer system of claim 1, wherein the computer is configured to transmit audio data to the home input/output node.

9. The digital wireless home computer system of claim 1, wherein the computer is configured to transmit audio-visual data to the home input/output node.

10. The digital wireless home computer system of claim 1, wherein the computer is configured to process the input signals received from the home input/output node, and, in response to this processing, to transmit signals to the output device to modify the presentation provided by the output device.

11. The digital wireless home computer system of claim 1, wherein the output device includes a display device.

12. The digital wireless home computer system of claim 11, wherein the display device includes a television.

13. The digital wireless home computer system of claim 1, wherein the output device includes a speaker.

14. The digital wireless home computer system of claim 1, wherein the computer and the home input/output unit are located in the same house.

15. The digital wireless home computer system of claim 14, wherein the computer and the home input/output unit are located in the same building.

16. The digital wireless home computer system of claim 14, wherein the computer and the home input/output unit are located in different buildings.

17. The digital wireless home computer system of claim 1, wherein the home input/output node includes a home appliance unit.

18. The digital wireless home computer system of claim 17, wherein the home appliance unit includes audio-visual equipment, and the system is a home entertainment system.

19. The digital wireless home computer system of claim 1, wherein the home input/output node includes a second computer.

20. The digital wireless home computer system of claim 1, wherein the home input/output node includes a peripheral device.

21. The digital wireless home computer system of claim 1, wherein the home input/output node is a stationary node.

22. The digital wireless home computer system of claim 1, wherein the home input/output node is a mobile node.

23. The digital wireless home computer system of claim 1, wherein the input/output control unit has a decoding engine for digitally decoding the signals it receives from the second digital wireless transceiver.

24. The digital wireless home computer system of claim 1, wherein the input/output control unit includes a decompression engine configured to decompress signals received from the computer via the first and second digital wireless transceivers.

25. The digital wireless home computer system of claim 1, wherein the input/output control unit includes a filter configured to filter signals received from the computer via the first and second digital wireless transceivers.

26. The digital wireless home computer system of claim 1, wherein the input/output control unit includes a digital filtering engine configured to filter signals received from the second digital wireless transceiver.

27. The digital wireless home computer system of claim 1, wherein the output device is a television, and the input/output control unit has an encoder configured to encode signals received from the second digital wireless transceiver into a television display format.

28. The digital wireless home computer system of claim 1, wherein the input/output control unit includes a media access controller communicatively coupled with the second digital wireless transceiver.

29. The digital wireless home computer system of claim 28, wherein the media access controller is configured to operate using an isochronous link protocol.

30. The digital wireless home computer system of claim 1, wherein the computer includes a compression engine configured to compress signals prior to their transmission to the home input/output node.

31. The digital wireless home computer system of claim 1, wherein the computer includes a media access controller communicatively coupled with the first digital wireless transceiver.

32. The digital wireless home computer system of claim 31, wherein the computer includes a memory communicatively coupled with the media access controller, the memory configured to store signals to be transmitted to the home input/output node, the media access controller configured to retrieve signals stored in the memory and to forward the signals to the first digital wireless transceiver for transmission to the home input/output node.

33. The digital wireless home computer system of claim 32, wherein the memory is a read/write memory.

34. The digital wireless home computer system of claim 33, wherein the read/write memory is configured to store audio and visual data, the computer further including a frame synchronizing engine communicatively coupled with the read/write memory and the media access controller, the frame synchronizing engine configured to synchronize the audio data and the visual data before communicating the audio-visual data to the media access controller.

35. The digital wireless home computer system of claim 32, wherein the memory is a buffer configured to store commands.

36. The digital wireless home computer system of claim 35, wherein the buffer is a graphics command buffer communicatively coupled with a graphics engine configured to prepare visual data from graphics commands stored in the buffer, the graphics engine communicatively coupled with the media access controller to provide the visual data.

37. The digital wireless home computer system of claim 36, wherein the graphics engine and the media access controller are communicatively coupled with a read/write memory, wherein the graphics engine is configured to store data in the read/write memory, and the media access controller is configured to retrieve the data from the read/write memory.

38. The digital wireless home computer system of claim 35, wherein the buffer is an audio command buffer communicatively coupled with an audio engine configured to prepare audio data from audio commands stored in the buffer, the audio engine being communicatively coupled with the media access controller to provide the audio data.

39. The digital wireless home computer system of claim 38, wherein the audio engine and the media access controller are communicatively coupled with a read/write memory, wherein the audio engine is configured to store data in the read/write memory, and the media access controller is configured to retrieve the data from the read/write memory.

* * * * *